(12) United States Patent
Briscoe et al.

(10) Patent No.: US 7,898,947 B2
(45) Date of Patent: Mar. 1, 2011

(54) CAPACITY MANAGEMENT FOR DATA NETWORKS

(75) Inventors: Peter John Briscoe, Bath (GB);
Elizabeth Graves Tector, Sammamish, WA (US)

(73) Assignee: Amdocs Systems Limited, Bath (GB)

( * ) Notice: Subject to any disclaimer, the term of this patent is extended or adjusted under 35 U.S.C. 154(b) by 600 days.

(21) Appl. No.: 11/753,521

(22) Filed: May 24, 2007

(65) Prior Publication Data

US 2008/0049614 A1    Feb. 28, 2008

(30) Foreign Application Priority Data

Aug. 23, 2006    (GB) ................. 0616719.1

(51) Int. Cl.
*G08C 15/00*    (2006.01)
(52) U.S. Cl. .................. 370/230; 370/468
(58) Field of Classification Search .......... 370/468, 370/477, 431, 437, 252, 230, 230.1, 235, 370/395.4
See application file for complete search history.

(56) References Cited

U.S. PATENT DOCUMENTS

| | | | | |
|---|---|---|---|---|
| 5,680,325 | A | 10/1997 | Rohner | 364/514 |
| 6,418,139 | B1 * | 7/2002 | Akhtar | 370/356 |
| 6,937,580 | B2 * | 8/2005 | Heatwole et al. | 370/322 |
| 7,245,635 | B2 * | 7/2007 | Mo et al. | 370/468 |
| 2002/0161891 | A1 * | 10/2002 | Higuchi et al. | 709/226 |
| 2005/0169313 | A1 * | 8/2005 | Okamura et al. | 370/477 |
| 2007/0121499 | A1 * | 5/2007 | Pal et al. | 370/230 |
| 2007/0147346 | A1 * | 6/2007 | Gilmartin | 370/352 |

FOREIGN PATENT DOCUMENTS

WO    03/005735    1/2003

OTHER PUBLICATIONS

Search Report and Examination Report from Application No. GB0616719.1 mailed on Nov. 17, 2008.

* cited by examiner

*Primary Examiner*—Brian D Nguyen
(74) *Attorney, Agent, or Firm*—Zilka-Kotab, PC

(57) ABSTRACT

A method of processing capacity information is disclosed, The capacity information relates to data capacity in a data network in which a consumer circuit is carried on, and consumes bandwidth made available by, a bearer circuit. The method comprises storing, in a network information database, an entity representing the bearer circuit, and associating capacity information with the bearer circuit entity specifying a first bandwidth quantity defining a quantity of bandwidth made available by the bearer circuit. Also stored is an entity representing the consumer circuit, and capacity information is associated with the consumer circuit entity specifying a second bandwidth quantity defining a quantity of bandwidth allocated to the consumer circuit. The consumer capacity information is then associated with the bearer capacity information in the database to indicate that the second bandwidth quantity allocated to the consumer circuit is to be consumed from the first bandwidth quantity made available by the bearer circuit. The resulting capacity model can be used to support service provisioning, service assurance and SLA management, network engineering and network planning processes.

17 Claims, 26 Drawing Sheets

CAPACITY MANAGEMENT FOR DATA NETWORKS

The present invention relates to the processing of capacity information and to the modeling, management and allocation of network capacity in data networks.

Modern telecommunications networks typically employ a large variety of communications technologies to provide a wide variety of services, including telephony, data services, application services and the like. Though many network operators hope to reduce this technological complexity in the future by migrating to so-called "next-generation networks"—for example using a converged IP/MPLS core over a high capacity optical infrastructure—this vision is easier to achieve in 'green field' scenarios where new infrastructure can be built. For existing networks, operators and others face major challenges in the migration of legacy services and legacy networks to some form of next generation network. The issues that service providers, standards bodies and equipment vendors are concerned with today include, for example:

- How to manage service interworking (the translation of packets from one technology to another, for instance, from ATM to IP),
- How to manage network interworking (encapsulation of one technology into another).
- The appropriate migration strategy or co-existence strategy for existing networks which includes ATM, Frame Relay, Ethernet and TDM.
- Providing end-to-end Quality-of-Service (QoS) and bandwidth management for high priority or QoS sensitive services such as voice and video across a diverse network.

The modeling and management of large scale data networks which may contain not only IP/MPLS, but a medley of co-existing data technologies overlying and abutting circuit-switched technologies presents significant challenges. Centralized tools for managing convergent data cores and access networks have not been generally available. Additionally, the nature of capacity management and capacity consumption in the data domain is much more complex than in the circuit switched technologies. Methods and tools for the management of data network capacity and of end-to-end QoS and bandwidth requirements in data technologies are currently inadequate.

The present invention seeks to alleviate some of these problems.

Accordingly, in a first aspect of the invention, there is provided a method of processing capacity information relating to data capacity in a data network in which a consumer circuit is carried on, and consumes bandwidth made available by, a bearer circuit, the method comprising: storing, in a network information database, an entity representing the bearer circuit, and associating capacity information with the bearer circuit entity specifying a first bandwidth quantity, said first bandwidth quantity defining a quantity of bandwidth made available by the bearer circuit; storing in the database an entity representing the consumer circuit, and associating capacity information with the consumer circuit entity specifying a second bandwidth quantity, said second bandwidth quantity defining a quantity of bandwidth allocated to the consumer circuit; and associating the consumer capacity information with the bearer capacity information in the database to indicate that the second bandwidth quantity allocated to the consumer circuit is to be consumed from the first bandwidth quantity made available by the bearer circuit, In this way a model of data capacity can be provided, which can enable more efficient network design, circuit design, network planning and service provisioning processes. For example, the provisioning of services over a network consisting of diverse technologies can be complex and difficult to automate, especially where QoS or bandwidth requirements are associated with the service. The present invention can allow explicit modeling of data capacity, preferably independently of the underlying technologies, thus simplifying the provisioning process. For example, capacity can be allocated to circuits in a circuit hierarchy without knowledge of the physical bearer technology which ultimately provides the capacity.

The data network typically comprises a plurality of interconnected devices also referred to as network nodes (such as routers, switches, servers, end-user equipment and the like), which provide data transmission functionality. Such a data network may be or include a telecommunications network which provides telecommunications services. Other types of services may additionally or alternatively be provided by or using the data or telecommunications network, for example data processing, storage, and retrieval services. Examples of such services include a mailbox, web space, an interactive travel booking system, a multimedia content delivery system and an online game, Such additional services can be particularly relevant in "next-generation" telecommunications networks.

The data or telecommunications network may use a variety of different network technologies and may include hardware and/or software interfaces between the technologies. The term "network technology" may refer to a given hardware, software and/or protocol standard or any combination thereof. Different protocol layers in a protocol stack may also be referred to as network technologies.

Generally, the terms "consumer" and "bearer" are used herein merely as relative terms to define the relationship between two entities, for example two circuits. Thus, a bearer circuit provides bandwidth for use by circuits above the bearer circuit in the circuit hierarchy, whilst a consumer circuit consumes bandwidth provided by a bearer circuit. A bearer circuit can itself be a consumer in relation to an underlying circuit, and conversely a consumer circuit can also be a bearer for overlying circuits. Such circuits are sometimes also referred to as logical bearers. The lowest circuit in the hierarchy may be directly associated with the physical network connections actually carrying data traffic (in which case it may be termed a physical bearer), but this need not necessarily be the case, The term "bandwidth" can refer to actual bandwidth available in a network circuit as determined by the networking technology used and related factors, and can also refer to a quantity of data traffic defined for some organisational purpose—for example bandwidth allocated to a particular data stream. This is also referred to herein as logical bandwidth. The terms bandwidth and data capacity are used herein interchangeably.

The term "entity" preferably refers to an organisational structure or unit for storing data in the database, for example a record, a row in a table of a relational database, an object in an object database, or a combination of related records, rows or objects.

The capacity information stored in the database may provide a capacity model, which may be associated with, or form part of, a network or resource model or inventory.

Associating capacity information with a circuit entity representing a circuit preferably comprises storing in the database a partition entity representing a quantity or partition of data capacity or bandwidth allocated to and/or available on the circuit. The term "bandwidth partition" preferably refers to a bandwidth allocation or more generally to a quantity of bandwidth (often allocated, reserved or assigned for some use though it may also simply be defined for organisational reasons). The partition may represent a subdivision of bandwidth (for example of the bandwidth available on a circuit), in which case there may be multiple partitions associated with the circuit but it may also represent the entire bandwidth of a circuit. Thus, the term "partitioning" as used herein preferably refers to the process of defining one or more partitions of some bandwidth quantity, and the one or more partitions may or may not represent the entire quantity being partitioned.

Preferably, associating the capacity information of the consumer circuit with the capacity information of the bearer circuit comprises associating a consumer partition entity defining a bandwidth partition of the consumer circuit no with a bearer partition entity representing a bandwidth partition of the bearer circuit to indicate that the bandwidth allocated to the consumer circuit which is represented by the consumer partition entity is to be consumed from the bandwidth made available by the bearer circuit which is represented by the bearer partition entity. This can allow bandwidth consumption to be effectively modeled.

Associating capacity information with a circuit entity representing a circuit preferably comprises defining a partitioning of a quantity of bandwidth made available by and/or allocated to the circuit into one or more partitions, each partition representing a portion of said bandwidth quantity. Defining a partitioning preferably comprises storing one or more bandwidth partition entities in the database each representing one of the defined partitions and being associated with the circuit entity.

A partition entity representing a bandwidth partition of a bearer circuit may be associated with an information transmission channel of the bearer circuit. In the case of a low-level or physical bearer, the transmission channel may represent a fundamental channel provided by the networking technology associated with the bearer. For example, where the bearer circuit is a TDM (time-division multiplexing), WDM (wave-division multiplexing) or FDM (frequency-division multiplexing) bearer, the information transmission channel may be a timeslot, transmission wavelength or frequency respectively. The transmission channel may also be a logical channel, and may be implemented by some data transmission mechanism and/or data transmission configuration settings associated with the bearer (and/or the relevant networking technology), where the data transmission mechanism and/or configuration settings enable low-level channelisation of the bearer. An example of such a data transmission mechanism, described in more detail below, is a port scheduler having associated queues for forwarding data packets.

Thus, data capacity partitions can be flexibly linked to the relevant organisational units, channels, and/or data transmission mechanisms of a variety of underlying transmission technologies, allowing the capacity model to model capacity independently of networking technologies.

At a higher-level in the circuit hierarchy, a bandwidth partition of a bearer circuit may be associated with lower-level bearer circuit (or more specifically, a capacity partition associated therewith) from which the higher-level circuit consumes its bandwidth.

Preferably, the method comprises associating capacity information with a circuit entity representing a circuit, the capacity information specifying data capacity in respect of a selected circuit direction. This can allow data capacity to be modeled more accurately. For the same reason the method may comprise associating capacity information with a circuit entity representing a circuit, the capacity information separately specifying data capacity in respect of each circuit direction.

A circuit may represent a connection in the network between two network nodes (typically between two ports on respective nodes), each node or port being represented in the database by a node or port entity, in which case the method preferably comprises associating a bandwidth partition entity with one of the node or port entities of the circuit to thereby represent a bandwidth partition of the circuit for traffic originating from that node or port. This can allow capacity information to be processed more efficiently. A partition entity representing a bandwidth partition of a bearer circuit may be associated with a traffic transmission mechanism associated with the node or port, the traffic transmission mechanism being assigned to transmit data traffic associated with the partition. The traffic transmission mechanism may comprise a queue of e.g. a port scheduler, the port scheduler being assigned to forward data traffic associated with the partition using the queue.

Implementation of the partition in the network may then be achieved by configuration of port configuration settings appropriate to the networking technology used, to configure the node/port and associated traffic transmission mechanism (for example to configure a port scheduler to forward certain traffic on a certain queue). In this way capacity information in the model can be related to the underlying network technology and the partitioning defined in the model can be efficiently implemented in the network using one or more of the network traffic management techniques that may be available. The partition entity may comprise information specifying one or more of: the bandwidth allocated to the traffic transmission mechanism (or queue), attributes or characteristics of the traffic transmission mechanism (or queue); the class-of-service, protocol or other characteristics of traffic serviced no by the traffic transmission mechanism (or queue). A fundamental channelisation of the bearer, as defined by the relevant networking technology, may also constitute a traffic transmission mechanism in this sense, e.g. a timeslot or wavelength of a TDM/WDM bearer, as already mentioned above.

More generally, model structures and inventories are preferably implemented in the network using corresponding network mechanisms. Thus, in the above specific examples, capacity partitions can be represented by traffic transmission mechanisms such as queues. At the time of implementation (which may be directly in response to model changes, or at some later time), the appropriate network mechanisms are selected and used to implement the model changes. The mechanisms chosen may vary in dependence on the networking technology used (which may itself not be selected until implementation time). The mapping between model structures and implementation mechanisms may be configurable and may itself be stored as part of the model or in a separate configuration database. In this way, the network implementation details are hidden from the high-level model and processes which use it, but flexibility and configurability can be maintained.

One or both of the nodes may, for example, be a switch or router. The method may comprise associating one or more partition entities with each of the node or port entities representing end nodes or ports of the circuit to thereby provide capacity information for each circuit direction. This can allow capacity of bidirectional circuits to be modeled more accurately and flexibly.

Advantageously, the method may comprise storing a partition entity for a given bandwidth partition, the given partition representing an allocation of bandwidth to a circuit, wherein the partition entity is associated with first information defining a first quantity of bandwidth allocated to the given partition from an underlying bearer, and second information defining a second quantity of bandwidth made available by the given partition for allocation to other (consumer) partitions. These quantities may be the same or different. This can provide improved flexibility, and can allow the representation of overbooking conditions in the capacity model. For example, the second information defining the second quantity of bandwidth made available by the no given partition may comprise a booking factor for indicating that the second quantity is a fraction or multiple of the first quantity. The factor may be one, i.e. to specify that the second quantity is equal to the first quantity.

The method may comprise providing an alert if the total bandwidth allocated to circuits or other partitions from the bandwidth of the given partition exceeds a predetermined threshold and/or preventing the allocation of bandwidth to a circuit or partition from the given partition if after allocation the total bandwidth allocated to circuits or partitions from the bandwidth of the given partition would exceed a predetermined threshold. The predetermined threshold may be the second quantity (the quantity made available by the partition), or may be expressed as a proportion of the second quantity. Similar checks can also be performed based on the first quantity (and the second quantity may be omitted), for example if the modeling of overbooking conditions is not required. By checking allocated bandwidth against thresholds it is possible, for example,, to provide advance warning where capacity of a bearer is nearing exhaustion, allowing corrective action (such as the creation of additional capacity) to be taken. To this end, alerts generated may be provided as input to a network planning system. Alternatively or additionally, the utilisation of capacity may be calculated as a numerical value (absolute or relative) and provided as input to a network planning system to assist in capacity planning.

The capacity model can thus be used to manage bandwidth allocation in the network, to check whether bandwidth is available for new circuits and how much bandwidth is available, to verify existing bandwidth allocations, and to identify utilisation of existing capacity, for example for planning purposes. In this connection, the method may therefore preferably comprise allocating bandwidth to a consumer circuit from a bearer circuit by associating a bandwidth partition entity associated with the consumer circuit with a bandwidth partition entity associated with the bearer circuit in the database. The model or database can then be used to guide any necessary changes to the actual network needed to implement the allocation, which changes may be initiated in response to the changes to the capacity model, which can help ensure the accuracy and consistency of the model.

The method may comprise associating, with a partition entity representing a given bandwidth partition information defining one or more traffic or service types for which the bandwidth represented by the partition entity is to be used. The information may comprise one or more of: a class-of-service indicator, a quality-of-service indicator, an overbooking factor and a traffic type indicator. This can allow for more accurate capacity modeling, and can enable automation or partial automation of bandwidth allocation processes For example, the method may comprise, in response to a request to allocate bandwidth from the given partition to another partition or a circuit where the traffic or service type of the other partition or the circuit does not match one of the defined traffic or service types, preventing the allocation and/or providing an alert. Similarly, the method may comprise, in response to a request to allocate bandwidth to a consumer circuit having an associated traffic or service type, creating a partition entity representing the bandwidth to be allocated, selecting a partition entity associated with a bearer circuit which has a traffic or service type matching that of the consumer circuit, and associating the created partition entity with the selected partition entity to indicate allocation of the bandwidth from the partition represented by the selected partition entity. This can allow allocation to be performed more efficiently and reliably, and can prevent allocation errors.

The method may comprise, in response to a request to allocate bandwidth to a consumer circuit having associated service quality information specifying a service quality which the consumer circuit is to provide: creating a consumer partition entity representing the bandwidth to be allocated, selecting a bearer partition entity from amongst a plurality of bearer partition entities associated with one or more bearer circuits, the selecting step comprising: selecting, if available, a partition entity having a service quality matching the consumer circuit service quality; and, if no partition with a matching service quality is available, optionally selecting an alternative partition entity; and associating the created partition entity with the selected partition entity to indicate allocation of the bandwidth from the partition represented by the selected partition entity. This can allow an appropriate partition to be selected automatically. Preferably, selecting an alternative partition entity comprises selecting a partition entity having a higher service quality than the intended consumer circuit service quality. This can ensure that, where a partition exactly matching the required service quality level is not available, an acceptable quality of service can nevertheless be provided.

Automatic allocation may, for example, be based on an overbooking factor or other quality-of-service indicator, or a class-of-service attribute. Where allocation is not automatic, an alert may be provided if the service quality provided by a selected bearer partition does not match that of the consumer partition, and an alternative allocation may optionally be suggested to the user.

The method preferably comprises, for a given bearer partition entity representing bandwidth available for allocation to circuits and being associated with one or more consumer partition entities representing bandwidth allocated from said available bandwidth, calculating the utilisation of the available bandwidth by reference to the associated consumer partition entities. Thus, the capacity model can be used to calculate utilisation of data capacity, for example for verification purposes, as already indicated above. The method may comprise comparing the utilised bandwidth to the available bandwidth, optionally using a booking factor associated with the given bearer partition entity. For example, the utilisation may be expressed as a percentage of the available bandwidth, with or without taking account of any booking factor associated with the partition.

For a given partition representing an allocation of bandwidth, the method may comprise defining one or more sub-partitions representing portions of the bandwidth allocated to the given partition. This can enable the creation of a more structured capacity model, which can simplify subsequent processing.

The method may comprise storing a partition entity representing a bandwidth allocation to a circuit, wherein the circuit is a logical bearer circuit representing the reservation of bandwidth from an underlying physical bearer. The partition entity may represent one of a trunk, tunnel or aggregated traffic and may comprise information specifying one or more of: the bandwidth allocated to the trunk, tunnel or aggregated traffic; the class-of-service of the trunk, tunnel or aggregated traffic;

and the class-of-service of the traffic carried by the trunk or tunnel or of the aggregated traffic. This can allow capacity to be modeled for more complex circuit hierarchies.

Preferably, the method comprises modeling a circuit hierarchy and an associated bandwidth allocation hierarchy linked to the circuit hierarchy and representing bandwidth allocations to circuits within the circuit hierarchy. More specifically, the method may comprise storing in the database circuit model data defining a circuit hierarchy comprising at least a consumer circuit for carrying data traffic and a bearer circuit providing bandwidth for the consumer circuit, and capacity model data defining a bandwidth allocation hierarchy comprising at least a bandwidth partition representing a bandwidth allocation to the consumer circuit and a bandwidth partition representing a bandwidth allocation to the bearer circuit, the bandwidth allocation to the consumer circuit being associated in the capacity model data with the bandwidth allocation to the bearer circuit to represent consumption of the consumer bandwidth allocation from the bearer bandwidth allocation.

In a further aspect of the invention, there is provided a method of processing capacity information relating to data capacity of data circuits in a network using a capacity information database, the method comprising storing in the database circuit model data defining a circuit hierarchy comprising at least a consumer circuit for carrying data traffic and a bearer circuit providing bandwidth for the consumer circuit, and capacity model data defining a bandwidth allocation hierarchy comprising at least a bandwidth allocation to the consumer circuit and a bandwidth allocation to the bearer circuit, the bandwidth allocation to the consumer circuit being associated in the capacity model data with the bandwidth allocation to the bearer circuit to represent consumption of the consumer bandwidth allocation from the bearer bandwidth allocation. This can allow the efficient storage and processing of capacity information.

The circuit hierarchy defined by the circuit model data may further comprise an intermediate circuit which names the consumer circuit traffic, the intermediate circuit being carried on the bearer circuit. In that case, the bandwidth allocation hierarchy may further comprise a bandwidth allocation to the intermediate circuit, the bandwidth allocation of the consumer circuit being associated with the bandwidth allocation of the intermediate circuit, and the bandwidth allocation of the intermediate circuit being associated with the bandwidth allocation of the bearer circuit, to thereby provide the association no between the bandwidth allocation of the bearer circuit with the bandwidth allocation of the consumer circuit, and to thereby represent consumption of bandwidth by the consumer circuit from the intermediate circuit and consumption of bandwidth by the intermediate circuit from the bearer circuit. Alternatively, the bandwidth allocation of the consumer circuit may be directly associated with the bandwidth allocation of the bearer circuit without being associated with a bandwidth allocation associated with the intermediate circuit, the intermediate circuit may have no bandwidth allocations associated with it, for example because it is defined for the purpose of routing data traffic independently of the bandwidth required or consumed by the data traffic. This can provide greater flexibility in modeling circuits and associated capacity information. A bandwidth allocation may be in the form of a partition as described herein and may be represented in the database by a partition entity as described herein.

The method may further comprise storing a bandwidth partition template, and creating a bandwidth partition entity representing a bandwidth allocation using the stored partition template. This can simplify the allocation of bandwidth, prevent errors, and lead to greater consistency.

In a further aspect, the invention provides a method of processing capacity information relating to data capacity in a network, comprising storing in a capacity information database information defining network circuits and bandwidth partitions representing bandwidth allocations associated with network circuits, storing a bandwidth partition template, and creating a bandwidth partition entity in the database in accordance with the stored partition template.

Creating a partition entity may comprise copying attribute values and/or partition hierarchy from the partition template. The partition template may specify one or more partition attribute values, the method comprising creating a bandwidth partition entity in the database having the partition attribute values specified by the template. The partition template may specify one or more sub-partition templates, the method comprising creating a bandwidth partition entity and one or more sub-partition entities in accordance with the template. This can further simplify the creation of complex capacity models.

The partition entity once created may be independent of the partition template or may remain linked to the partition template such that changes made to the partition template are reflected in the created partition. For example, the method may comprise associating the created partition entity with the partition template, and updating the partition entity in response to changes to the partition template occurring after creation of the partition entity from the partition template. This can provide greater flexibility and control, and can be applied to the template as a whole or to individual aspects of a template such as individual attributes or hierarchical relationships with other partition templates. Accordingly, the partition template may specify one or more partition attributes, and, for a given partition attribute, may comprise an indicator specifying whether the attribute value of a partition entity created from the template, once created, is to be independent of or dependent on the attribute value specified in the template. The method may then comprise modifying the attribute value of the created partition entity in response to modification of the attribute value specified by the partition template if the indicator specifies that the attribute value is to be dependent.

Partition templates are also referred to herein as partition policies, and can enable policy management of data networks, with policies providing global sets of settings for data capacity partitions.

The method preferably further comprises receiving user input, modifying capacity information in the database in response to the user input, and modifying the network or the configuration of the network in dependence on the modified capacity information. In this way, instead of being a passive reflection of the network, the capacity information in the database can take on a controlling function, whereby the state of capacity information in the database controls the state of the network, and not vice versa. In other words, the capacity information can provide a capacity model which acts as a control plane for the network. This can ensure accuracy of the model and can improve reliability. In a refinement of this approach, modifying the network may include modifying a network inventory in dependence on the modified capacity information, and then modifying the network in dependence on the modified network inventory. Thus, the network inventory acts as a control plane for the installed network, but is in turn controlled by the capacity modes. Changes can be made at the higher level of the capacity model (and expressed in terms of capacity rather than network resource detail), and then automatically propagated to the network itself typically using predefined automation processes which specify how capacity model changes are transformed into resource inventory changes and/or changes in the installed network.

The invention further provides a data capacity management system having means for performing a method as described herein, adapted to process data capacity information, in combination with a network planning system adapted to perform network planning operations in dependence on the capacity information. By combining a network planning system with a data capacity management system as described herein, network planning operations can become more efficient and accurate, particularly for data networks such as IP, Ethernet and MPLS networks.

The invention further provides a data capacity management system as described herein, adapted to process data capacity information, in combination with a service provisioning system adapted to perform service provisioning operations in dependence on the capacity information. Combining a service provisioning system with a data capacity management system as described herein can allow traditional service provisioning methods as used by communication service providers to manage their transport networks (for example TDM and WDM networks), to be applied to data networks and so improve control and efficiency of service provisioning processes, particularly with regard to maintaining service quality by neither under-utilising or over-utilising the network.

In a further aspect, the invention provides a data capacity model for modeling data capacity in a telecommunications network, the model specifying one or more communications circuits and, for at least one communications circuit, one or more bandwidth partitions each representing a portion of the bandwidth of the communications circuit. The data capacity model may include or be associated with a network resource model describing network resources available in the telecommunications network.

The term "network resource" preferably includes physical and logical resources. Physical resources may, for example, include network equipment including network devices (e.g. muters, switches), device components, cards, ports, cables, ducts and the like. A network resource model typically describes resources of a network, in particular defining network nodes (e.g. devices) and connections between nodes. A network resource model may also be referred to as a resource inventory.

A consumer partition representing a consumer circuit is preferably associated in the model with a bearer partition representing a bearer circuit, the association representing the allocation of bandwidth from the bearer partition to the consumer partition, preferably taking into account any bandwidth that may be consumed by the management overhead of the consumer partition. This can provide a flexible framework for modeling data capacity.

The invention also provides a network planning system adapted to access a data capacity model as described herein, analyse the capacity information, and generate planning data in dependence on the outcome of the analysis. This can simplify automated network planning processes.

The planning data preferably relates to the creation of additional capacity, the system being adapted to modify the configuration of a network in dependence on the planning data to create the additional capacity in the network. Thus, the results of the planning operation can be directly translated into changes in the network. The network planning system is preferably adapted to modify the data capacity model in dependence on the planning data to create the additional capacity in the model, and the configuration of the network is then modified in response to the modification made to the capacity model. In this way, the capacity model can serve as a control plane as described above. Similarly, the system may be adapted to modify a network resource inventory defining network resources of the network in response to the modification made to the capacity model, and the configuration of the network is then modified in response to the modification made to the network resource inventory.

The network planning system may, for example, be adapted to identify a bearer circuit for which associated capacity information indicates that the bandwidth allocated to consumer circuits from the bearer circuit exceeds a predetermined threshold, or is approaching, equals, or exceeds the total bandwidth available on the circuit, and, in response to identifying said bearer circuit, to generate planning data relating to the creation of one or more additional circuits or of additional network resources so as to provide additional capacity. The system is preferably adapted to initiate creation of the one or more additional circuits or network resources, preferably in dependence on the planning data. Thus, additional capacity can be created automatically depending on need.

The network planning system preferably comprises means for storing one or more service definitions, each defining a service available to users of a telecommunications network and specifying one or more capacity requirements associated with the service; the planning system being adapted to receive forecast information relating to a given service, calculate an expected capacity demand based on the forecast information for the service and the capacity requirements specified for that service in the corresponding service definition, and to modify the data capacity model so as to create additional data capacity in dependence on the calculated expected capacity demand.

This can enable more effective planning. The service definitions may be in form of a product model as described in more detail below. The system is preferably adapted to add one or more bandwidth partitions to the capacity model so as to create the additional data capacity.

A given service definition may specify a quality of service parameter, the system being adapted to add one or more bandwidth partitions to the capacity model having a corresponding quality of service parameter.

The network planning system is preferably adapted to calculate expected capacity demand based on forecast information for a plurality of defined services and on capacity requirements specified for those services in the service definitions.

The system may be adapted to add bandwidth partitions by creating one or more circuits and then defining bandwidth partitions for the circuit or circuits.

Creation of resources or circuits may here mean creation in the capacity model, or in a master network inventory (or resource model), with creation in the model or inventory in turn triggering network engineering processes to implement (physically and/or by configuration) the new circuits in the network. The network planning system may further be adapted to perform a method of processing data capacity information as described herein.

In a further aspect, the invention provides a service provisioning system adapted to access a data capacity model as described herein, the system being further adapted to receive a service request for a telecommunications service having a data transmission component with at least one associated requirement, to assign a circuit to the service using the capacity model in dependence on the at least one requirement, and provision the service using the assigned circuit. This can improve the efficiency of service provisioning processes.

In assigning a circuit, the system is preferably adapted to create the circuit in the capacity model, and to assign bandwidth to the circuit from a bearer circuit. The bearer circuit is preferably selected in dependence on the at least one requirement and on capacity information associated with the circuit. In this way, services can be provisioned more effectively. The system is preferably adapted to select a bandwidth partition associated with a bearer circuit in dependence on the at least one requirement, and associate the created circuit with the selected bandwidth partition. The at least one requirement preferably comprises one or more of, a data capacity requirement, a quality of service requirement, and a class of service requirement. The service provisioning system is preferably adapted to modify the configuration of one or more network resources to provision the service (directly, or by changing the configuration in a network resource inventory, the changes then being automatically propagated to the network as described above).

The service provisioning system preferably further comprises means for storing one or more service definitions, each defining a service available to users of a telecommunications network and specifying one or more capacity requirements associated with the service, and wherein the service request specifies one of the stored service definitions; the system being adapted to assign one or more circuits to the service using the capacity model in dependence on the one or more capacity requirements, and to provision the service using the assigned circuit or circuits. The service definitions are preferably in the form of a product model. Within the product modes, each "product" or service definition may be associated with one or several service components, and each service component may have data capacity requirements defined for it. The provisioning system then preferably creates or assigns circuits in the capacity model for each service component based on the specified capacity requirements.

The assignment of circuits to services or service components is preferably by way of bandwidth allocations or bandwidth partitions associated with circuits as described in more detail elsewhere.

Thus, the product model defines data capacity requirements for services which can automatically be implemented in the capacity model.

This correspondence between product/service definitions in the product model and bandwidth partitions in the capacity model can simplify automatic service provisioning and can also allow companion of the provisioned services to the original product definitions.

The invention also provides a network information database for storing capacity information relating to data capacity in a data network in which a consumer circuit is carried on, and consumes bandwidth made available by, a bearer circuit, the database comprising: an entity representing the bearer circuit; capacity information associated with the bearer circuit entity specifying a first bandwidth quantity, said first bandwidth quantity defining a quantity of bandwidth made available by the bearer circuit; an entity representing the consumer circuit, and capacity information associated with the consumer circuit entity specifying a second bandwidth quantity, said second bandwidth quantity defining a quantity of bandwidth allocated to the consumer circuit; and wherein the consumer capacity information is associated with the bearer capacity information in the database to indicate that the second bandwidth quantity allocated to the consumer circuit is to be consumed from the first bandwidth quantity made available by the bearer circuit.

The capacity model described herein can be used to support service provisioning, service assurance and SLA management, and network engineering and network planning processes. The capacity model allows data capacity in a network to be modeled and managed explicitly. Furthermore, as mentioned above, changes to the capacity model can be implemented automatically in the network, preferably by modifying a network model and propagating the network model changes to the physical network. In this way, the capacity model can take on an active controlling function. This feature is of particular benefit as it can simplify the management of the network and provide significant efficiency savings.

Accordingly, in a further aspect, the invention provides a network management system for managing a communications network, comprising: database means for storing a capacity model modeling allocation of bandwidth to data circuits in the network; a capacity management component operable to change the capacity model so as to add, remove or modify bandwidth allocations; and a capacity implementation component for implementing capacity model changes, adapted to reconfigure the network in response to a change to the capacity model to thereby implement the capacity model change in the network.

The system preferably further comprises database means for storing a network model modeling network nodes and connections between network nodes, and a network implementation component adapted to reconfigure the network in response to changes made to the network model. The capacity implementation component is then preferably adapted, in response to a change to the capacity model, to modify the network model to implement the capacity model change in the network model, whereby the modification to the network model is implemented in the network by the network implementation component, that is to say the capacity implementation component preferably does not directly reconfigure the network but does so via the intermediary of the network model. In this context "reconfiguring" preferably encompasses both reconfiguring the topology of the network by adding or removing network nodes or devices or changing connections between nodes or devices, as well as reconfiguring existing devices (e.g. by transmitting configuration commands to change device settings).

In a further aspect, the invention provides a method of processing information relating to resources in a communications network, comprising: storing service data defining services provisioned in the network; storing a resource inventory defining network, resources of the network; for each of a plurality of provisioned services, associating the service in the service data with resources in the resource inventory which are involved in providing the service; receiving information relating to a network resource; identifying one or more services in the service data which use the resource; and processing the information in dependence on the identified service or services. This can allow services affected by given network resource to be identified. The information preferably comprises one or more of performance information relating to performance of the resource; event information relating to an event occurring at the resource; and status information relating to the status of the resource. The information may relate to a failure of the network resource. In this way, the services affected by device failures, poor performance or other events relating to given resources can be identified, and appropriate action can be taken (for example, modifying the service user or providing an alternative service).

Associating services with resources may comprises: associating services in the service data with circuits or bandwidth partitions in a capacity model as described herein, the circuits or bandwidth partitions being used to provide the associated services; and associating circuits or bandwidth partitions in the capacity model with resources in the resource inventory, the resources being used to provide circuits of given bandwidth as specified by the circuits or bandwidth partitions. Thus, the capacity model can be used to provide the link between resources on the one hand and services which use or are affected by those resources on the other hand.

In a further aspect, the invention provides a method of managing services in a communications network, comprising providing a resource inventory representing network resources of the communications network; providing service data representing services provisioned to users of the network; providing a data capacity model for modeling data capacity in the network, the model defining one or more communications circuits and specifying data capacity of the circuits, for each of a plurality of services in the service data, associating the service with one or more circuits in the capacity model, whereby the circuits are used to provide the service; for each of a plurality of circuits in the capacity model, associating the circuit with one or more resources in the resource inventory, whereby the resources are used to provide the circuit; and for a given resource, determining the service or services which use the given resource by reference to the associations between resources and circuits and between circuits and services. The capacity model preferably specifies bandwidth partitions of circuits, the services and/or resources being associated with bandwidth partitions in the capacity model.

The invention also provides a capacity management system having means for performing any of the methods described herein, a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figure 1:
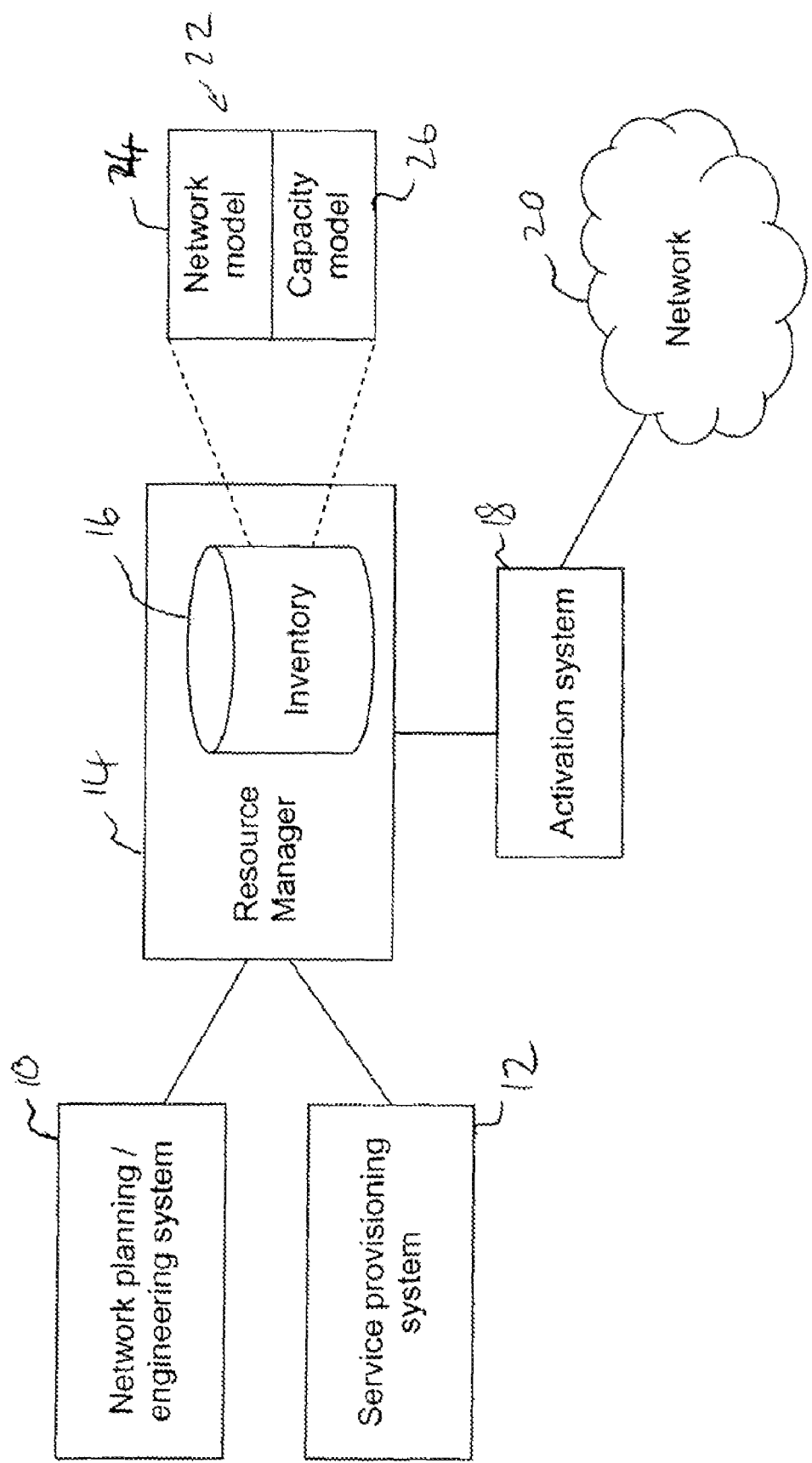
FIG. 1 illustrates a data capacity management system having a capacity model in overview.

The embodiments described below are presented mainly in the context of packet-switched technologies due to the increased complexity of capacity management in that domain, though the methods may also be applied to circuit-switched technologies.

In circuit-switched technologies where bandwidth is statically consumed, capacity consumption can often be modeled as a static parameter defined on a circuit. Underlying circuit capacity is consulted by timeslot mapping and each layer in the circuit hierarchy consumes bandwidth from the underlying layer and presents bandwidth to the overlying layer.

In packet-switched technologies, the capacity requirements for any individual data flow are dynamic. Packets are usually only sent when there is data to transmit, and therefore the required bandwidth of any given flow varies considerably through time. On the one hand, this is the bandwidth efficiency bonus of packet-based technologies; bandwidth is not dedicated and hence not wasted. On the other hand, in order to provide quality of service (QoS) guarantees, some level of bandwidth management and bandwidth reservation is usually required if data technologies are to be used for anything other than best effort services Some specific challenges posed by bandwidth management in data networks have been identified, and include:

Unlike circuit-switched technologies bandwidth requirements in packet-switched technologies typically vary over time, so it may be necessary to estimate the bandwidth required for a flow.

Not all layers in a data circuit hierarchy necessarily participate in bandwidth management.

Mechanisms for providing bandwidth guarantees and differentiated services are typically not standardized within a data technology or across different data technologies, and can depend on the network provider's Quality of Service (QoS) policy, the equipment capabilities, and the technology itself.

Data technology layering may require a mapping of one QoS policy to another.

Providing differentiated treatment of packets often requires complex bandwidth resource partitioning in the form of queues in the equipment which supports the network.

Directionality is inherent in many data networks.

The wealth of parameters and options offered by equipment vendors for supporting QoS policy definition can make maximizing bandwidth usage while still adhering to bandwidth guarantees a 'black art'.

Bandwidth management in data networks typically uses two QoS modes, the congested mode and the non-congested mode. When the data network is not congested, bandwidth limits and QoS policies may be relaxed to maximize bandwidth throughput. When congested, the network will usually restrict bandwidth throughput to the negotiated rates this is when the differentiated treatment of services is applied, and low priority packets are dropped or delayed.

For dynamically routed flows, attributing capacity consumption to a particular path within the network can be difficult or impossible without real-time monitoring of the network.

Overview

FIG. 1 illustrates a telecommunications system and associated capacity management system in overview. The telecommunications system comprises a network 20 used to provide telecommunications services to end-users. A resource manager 14 manages network resources available in network 20. Specifically, resource manager 14 maintains an inventory 16 of the network resources and controls changes and additions of resources. The inventory 16 stores information needed for a variety of network planning, management, provisioning and configuration processes.

A network planning/engineering system 10 interacts with the resource manager 14 to manage changes to the network, for example to provide new network resources, typically either in response to specific user requirements, capacity usage or exhaustion thresholds, or based on strategic planning. A service provisioning system 12 interacts with the resource manager 14 to manage the provisioning of new services to network users as well as changes to and removal of existing services. Provisioning of network services may involve the design of telecommunications circuits connecting specific network locations, and the identification, reservation and configuration of network resources—in particular data capacity or bandwidth—needed to form the circuits. In addition to the fulfillment of specific user service orders, circuits may also be designed to provide capacity paths in the network as part of the planning process. To provide a telecommunications circuit between two specified locations, it may be necessary to find a sequence of individual circuit paths which together form a route between the required end points, and reserve bandwidth on each of those paths to ensure the resulting circuit meets overall bandwidth requirements. Services may be provisioned across a range of different networking technologies, including structured bandwidth technologies such as SDH, SONET, PDH, DWDM, and packet data domains such as Gigabit Ethernet, IP, MPLS and RPR. The services made available to users of the telecommunications system are also referred to as telecommunications products, and may be defined in a product catalogue or product model which specifies the characteristics and requirements of products (such as the bandwidth of a communications service).

Changes made to the inventory 16 during the creation of new network resources or services are implemented in the network 20 by way of an activation system 18 which performs the necessary device configurations to a activate new resources and/or make new services available for use.

To support these functions, the inventory 16 includes a network resource model 24 storing details of network resources such as network no circuits, nodes, equipment (e.g. routers), ports queues and the like. To allow the effective management of data capacity across varied technologies, the inventory 16 further provides a capacity model 26 defining how capacity available in the network is allocated to particular network resources, in particular to circuits.

For the sake of clarity, the resource model 24 and capacity model 26 have been described here as separate models, but it should be noted that they need not be separate in practice. In preferred embodiments, they represent different aspects of a single unified model, referred to herein as the inventory model 22.

More specifically, the capacity model models data capacity of physical and logical circuits within the resource model, and utilisation of that data capacity by circuits. This is achieved mainly by associating a circuit (logical or physical) with one or more bandwidth partitions. These partitions represent a partitioning of the data capacity (or bandwidth) provided by that circuit. The utilisation of the data capacity of a lower-level circuit by a higher-level circuit is then modeled by linking a partition associated with the higher-level circuit to a partition of the lower-level circuit.

The total bandwidth available on a circuit may be represented by a single partition or divided into multiple partitions, for example based on the type of traffic to be carried, the class of service (CoS), or the quality of service (QoS) to be achieved.

A partition defined in the capacity model typically defines the amount of bandwidth it consumes from an underlying bearer and the amount of bandwidth it makes available to overlying circuits. The bandwidth made available by a partition is referred to herein as its Logical Bandwidth (LBW). Bandwidth consumed and bandwidth made available need not be the same: a partition may, for example, make available more capacity than it consumes. This is known as bandwidth overbooking, and is often useful, for example, where typical actual bandwidth consumption on a circuit is expected to be lower than the theoretical maximum provided for. For example, in the provision of residential broadband Internet access services, it is usually expected that not all customers will use their connection to its full (theoretical) capacity at all times, and to reserve the full rated bandwidth for each customer would lead to an inefficient use of available bandwidth. In the capacity model, partitions may specify an explicit overbooking factor to model this.

Conversely, a partition may make available less bandwidth to an overlying circuit than it consumes. This may, for example, be due to signaling overhead when data streams using one communication protocol are carried over another (for example, a Virtual Private Network/VPN over IP). To model this, partitions in the capacity model may specify what is referred to herein as an adaptation factor. Adaptation factors and overbooking factors may also be combined.

The use of adaptation factors and overbooking factors allows the relationship between bearer and consumer circuits to be defined accurately. The model can then be used to calculate consumed and available bandwidth, (e.g. overall or for certain traffic types or classes of service or QoS levels). The information made available by the capacity model can assist both short-term and long-term network planning, as well as provisioning processes, as is described in more detail below.

In preferred embodiments, as already mentioned above, the capacity model is provided as an extension to a network resource model. By combining the resource model with a capacity model, network planning/engineering processes and service provisioning processes (as performed, for example, using modules 10 and 12) can be simplified, and more powerful, flexible processes can be provided, For example, capacity requirements can be more easily mapped onto existing network resources or translated into resource requirements and detailed network engineering plans. Flexibility also arises because the planning, engineering and provisioning processes can be made independent of the physical network implementation and the various networking technologies used. The capacity model effectively provides an abstraction layer between the higher-level activities and processes and the lower-level resource model and associated network implementation detail. Planning, engineering and provisioning processes can be expressed, at least initially, in terms of data capacity rather than in terms of specific resources or specific network devices.

The interaction between the capacity model and the remainder of the telecommunications management system, in particular with the resource model 24, the network planning system 10 and the service provisioning system 12 will now be described in more detail.

Interaction with the Resource Model

The interaction between the capacity model 26 and the network resource model 24 can enable service provider operations to be supported more effectively and flexibly.

In preferred embodiments, the resource model 24 is not a passive record of the networked resource. Instead, it provides a 'control plane' for the resource, which includes analysis and control functionality acting on a model representation which is defined to serve the needs of higher-level processes rather than to provide a direct one-to-one correspondence to the actual installed networking equipment (i.e. physical resources) and associated logical resources (such as higher-level information streams that are multiplexed onto the physical resources). Thus, the purpose of the representation is not necessarily to accurately model network resources (as is the traditional approach), but to effectively support service provider operations (such as service provisioning and network planning). The inventory is optimised for the latter rather than the former purpose, and is hence also referred to as the "repurposed inventory".

Data capacity management using a capacity model as described herein is a specific implementation of this approach of providing a repurposed inventory. The capacity model allows detailed, device-specific controls to be transformed into controls over the capacity to deliver services made available by the resource, based on the quantity, quality and content of the products offered to users, instead of based on the technology resources in the network. The control plane then acts to analyses create and/or consume this capacity using the technology prioritised by the communications service provider and to create and control the life-cycle of services that consume the capacity within the resource.

For example, a network manager may modify the capacity modes to add a new consumer circuit of a given bandwidth between two given locations. The capacity model can then select a bearer circuit suitable for carrying the new consumer circuit and update the model to represent consumption of the bandwidth. If no appropriate bearer circuit is found, the capacity model may instruct the underlying resource model to create additional network resources so as to provide the required bearer circuit. These modifications to the underlying resource model are then implemented in the physical network, for example by connecting equipment, installing new equipment, configuring devices and the like. The detail of the implementation is hidden from the network manager, who operates at the abstract level of the capacity model. Alternatively, the network manager may simply request provisioning of a service requiring a connection of a certain bandwidth, and a service provisioning system can then automatically add a consumer circuit to the capacity model using the process described above. Thus, the complex network changes that may be needed to provision a service can be automated and hidden from the operator, who can provision a service merely by selecting the service from a product model or catalogue and specifying any necessary parameters (such as locations).

The definition of partitions within the capacity model and their subsequent utilisation by services enables the resource operator to treat the resource in terms of its key service provider operations, rather than the detailed settings of individual devices. For example, this mechanism can enable the service provider to manage the resource, services and service quality of data networks with the rigour that is associated with traditional telecommunications TDM technologies such as PDH, T-Carrier, SDH and SONET, This is achieved by treating the capacity provided by data networks as if they were fixed data channels provided by TDM networks. What is more, in using this approach, the advantages offered by data technologies are not lost. These advantages, particularly flexible bandwidth and flexible quality of service, can be captured in the definition of the partitions, and specialist inventory automation can be provided to implement them into each type of physical and technological resource.

Interaction with Planning Processes

The capacity model can provide an efficient means of analysing and controlling the capacity deployed into the network by the service provider; one that is based on the quantity, quality and content of the products it offers to the end user, not on the implementation of individual service settings for no individual technologies. This again is an example of the repurposing of the inventory. When determining what capacity is required in which locations, in order to provide the appropriate resources matching product offerings, this mechanism removes the dependence on complex device-specific details. Instead, the measures of resource capacity can be systematically linked to the Service Level Agreements of the products offered.

Accordingly, the specification of different types of partition in the capacity model can correspond to the different service qualities offered by the service providers portfolio of products.

The creation of partition instances of specific capacities across the network can be determined by existing telecommunications network planning functions, in this case, it may be based on prescribing a bandwidth for each product, the Logical Bandwidth (LBW), recording the service utilisation and utilisation rates of the partitions in the inventory and adding forecast demand for services. This enables data channels to be created of the correct quality and quantity between each location in the network, including the customer sites, in order to provide resources to meet the demand for services.

In this way, previously largely informal techniques for planning data networks can be transformed into rigorous telecommunications planning activities without recourse to device and service configurations in the data network. Such details are stored in the resource model, but typically only used when services are activated in the network.

Use of the Capacity Model in Service Provisioning/Service Order Fulfillment

The physical implementation of a service in the data network will typically not actually consume a fixed quantity of capacity and it will often be possible to assign an arbitrarily large number of services to the same resource. However, this can result in poor performance of the services and may well violate Service Level Agreements with the user.

The capacity model can be integrated with the service provisioning system 12 (see FIG. 1) by using a product specification which assigns a specific quantity, quality and content to each product offered by the service provider. The quantity and quality are then preferably expressed in terms of logical bandwidth. The service provisioning system uses this product specification to consume the specified bandwidth of capacity from partitions of the specified quality.

Normal service provisioning mechanisms can in principle be used to assign services to bearers that result in a connection to the content specified in the product. However, using the capacity model, this mechanism can be enhanced so that services are assigned to the correct partition in the bearer, based on the specified service quality. This can be fully automatic or as an assistant to manual service provisioning.

Furthermore, use of the capacity model can enable the provision of an inventory representation of both service and capacity that prevents the assignment of services to a partition, or bearer, if the assignment would consume more capacity than is designated to be available in the partition (e.g. by planning and engineering operations). This may prevent the assignment, or may result in a warning to the operator that the limit has been exceeded. Furthermore, as the capacity of the partition is consumed, this utilisation and utilisation rate can be used to provide data for the planning operations (e.g. as an input to planning system 10). Thus, the capacity model can serve not only to assist planning and service provisioning individually, but to integrate both processes so that utilisation by existing services and specific requirements for new services can be evaluated during the provisioning process, and the results can be fed back to the planning process or system to enable creation of new capacity to meet current and future demand. This direct, feedback-based planning can of course occur alongside longer-term, line, strategic planning.

As one example of this, a threshold may be set at some percentage of the total capacity of a partition, which, when exceeded, can be used to trigger an alert, which will result in further planning activity. In some embodiments, planning system 10 may be configured to automatically create new network resources in the inventory 16 (more specifically, the resource model 24) in response to an alert generated by the capacity model, for example due to a utilisation threshold being exceeded.

The capacity management system described herein includes various operations, processes, and functions associated with the capacity model, for example relating to the creation and modification of the model, and to the analysis and verification of the model (e.g. the calculation of bandwidth utilisation in the model). For convenience, the term "capacity model" as used herein preferably includes such processes and operations, even though they may actually be implemented independently of the model. The model data itself (and the inventory or network model 16 of which it forms a part) is typically stored in a database.

The Capacity Model

The capacity model will now be described in more detail with reference to FIGS. 2 to 20 of the drawings. These schematically show simplified capacity models and illustrate typical capacity modeling scenarios, purely by way of example. Many of the examples are set in the context of an IP/MPLS data network, with queue-based port schedulers providing a basic mechanism for implementing partitioning in the network. It is important to note, however, that the capacity model is in no way limited to this context. Instead, the capacity model can be used with any other networking technology and can also be adapted easily for future networking technologies. In essence, the capacity model provides a technology-independent view of data capacity in a network, which can be mapped onto any suitable networking technology using mechanisms appropriate to the technology. Specific technologies (e.g. IP/MPLS) and associated mechanisms (such as port schedulers) are referred to herein to enable easier understanding of the application of the capacity model to real-world modeling scenarios.

Generally speaking in the network model, the capacity provided by a connection between ports on a device is represented by a bearer circuit.

In TDM or WDM a bearer usually sits on top of a physical link and is "channelized" to provide fixed capacity of high quality for the overlying circuits in homogeneous, discrete chunks of bandwidth in the form of timeslot or wavelength allocations. The inventory 16 records these entities and their relationships to provide an accurate capacity model of the network. In the capacity model the fixed capacity, high-quality channels can be partitioned into lower, or equal-quality capacity partitions which represent allocations of bandwidth from the total bandwidth made available by a given timeslot or wavelength.

In data networks (for example IP/MPLS networks), the bearer capacity between two end-points can be provided by a physical link as well as by an underlying TDM or WDM circuit positioned at any level in the circuit hierarchy. This bearer capacity is typically divided by a scheduling mechanism that operates on the transmitting end-point, which can therefore be a physical port where the link is connected or a logical port where the TDM/WDM channel is terminated.

The scheduler typically creates and manages a configurable number of queues where packets are forwarded and then wait to be transmitted in the appropriate order. This allows the bearer bandwidth to be divided in any number of chunks of different size with each queue being assigned a dedicated portion of the bandwidth. A port scheduler queue can thus provide a basic mechanism for partitioning traffic in an MPLS bearer which is analogous to a timeslot or wavelength of a TDM or WDM bearer.

In the present examples, bearer capacity partitions may therefore be mapped in the capacity model not only to TDM timeslots or WDM wavelengths, but also to specific port scheduler queues. As already mentioned, more generally, bearer partitions can be mapped to channels based on any suitable channelisation/data transmission mechanisms, depending on the bearer technology actually in use. The underlying bearer channels may be represented in the capacity model by single partitions or may be subdivided into multiple partitions.

This flexible subdivision of the capacity of bearers is here referred to as bandwidth partitioning, which, in effect, is performed at the transmitting physical or logical port. The partitioning configuration at one end can be independent from the partitioning configuration at the other end of a bearer; therefore, bearer circuits can be unidirectional or bidirectional, symmetric or asymmetric.

Figure 2:
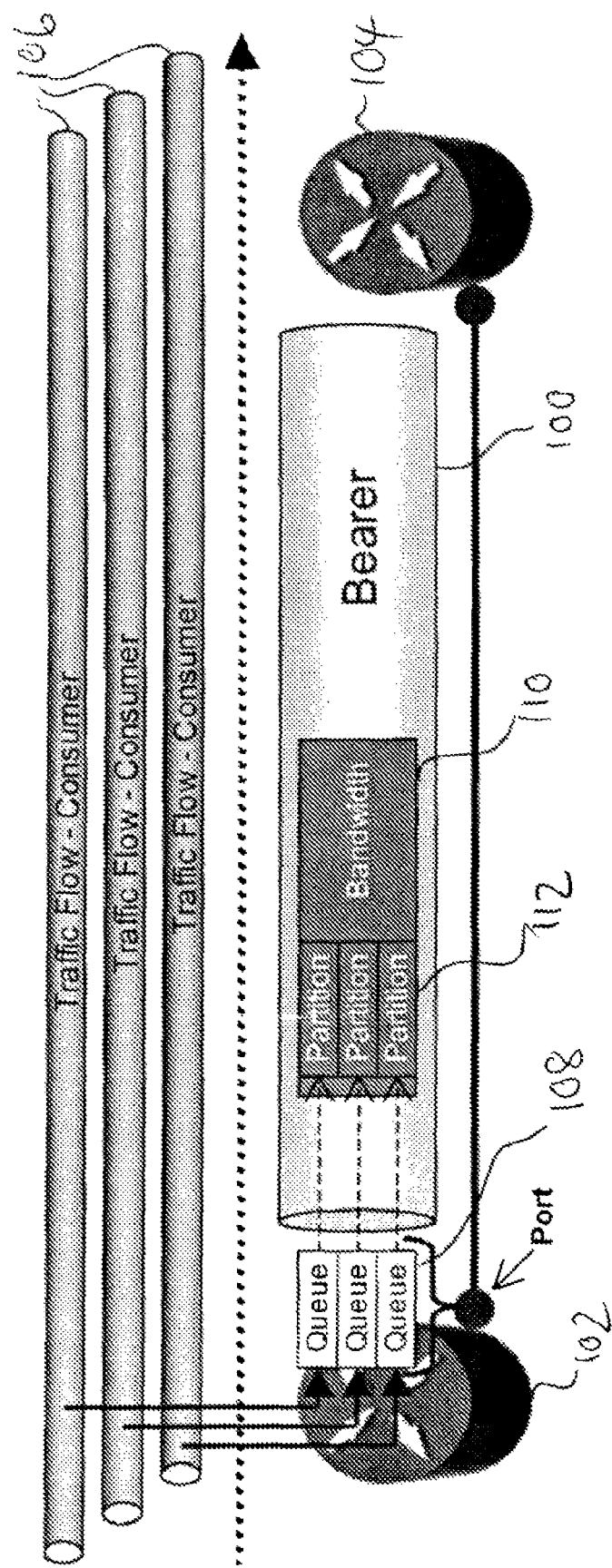
FIGS. 2 to 20 illustrate various capacity management scenarios.

Each traffic flow that is forwarded on one of these queues consumes bandwidth from the corresponding bandwidth partition and is therefore referred to here as a consumer circuit. This scenario is illustrated in FIG. 2, which shows a bearer 100 between two end points 102, 104. Three traffic flows or consumer circuits 106 are carried on the bearer by way of separate queues 108. These serve to partition the bandwidth 110 of the bearer 100 into three bandwidth partitions 112 as shown.

Note that a traffic flow is by nature a unidirectional packet stream from source to destination. However, if a traffic flow also exists in the opposite direction, the two flows can be represented by a single circuit in the capacity model. Therefore a consumer circuit can also be unidirectional or bidirectional, symmetric or asymmetric.

In the capacity model, the bandwidth utilization of a consumer circuit is recorded with a static value referred to as Logical Bandwidth (LBW) and associated with the transmitting end-point. For a bidirectional consumer circuit, two independent LBW values are recorded, one for each termination point.

Regardless of the dynamic nature of traffic flows, the LBW represents the amount of expected bandwidth that the flow will consume (in one direction) which is taken into account from the point of view of capacity management.

In technologies such as Resource Reservation Protocol (RSVP) in IP networks, bandwidth can be reserved for a specific flow and therefore it is directly represented by the LBW in the capacity model.

In other transmission technologies the LBW can be derived from other parameters, such as in the case of ATM where the LEW can be calculated from the traffic parameters of the PVC (permanent virtual connection), which is similar to what the ATM Call Admission Control algorithm does in calculating the equivalent bandwidth of a PVC.

In TDM there exists a fixed circuit hierarchy that allows the bandwidth of a circuit to be further sub-divided, i.e. channelized, into smaller chunks. A VC4 for example, uses one of the timeslots of the underlying STM bearer and can be sub-channelized in order to provide capacity for the overlying VC12s.

In data networks, there is typically no such fixed structure and the large variety of transmission technologies and reservation protocols provide much more flexibility in bandwidth allocation, which introduces a different level of complexity in modeling data networks. However, from a capacity model standpoint the principle remains the same: a consumer circuit can provide bandwidth for other overlying circuits and therefore act as a logical bearer for them.

Figure 3:
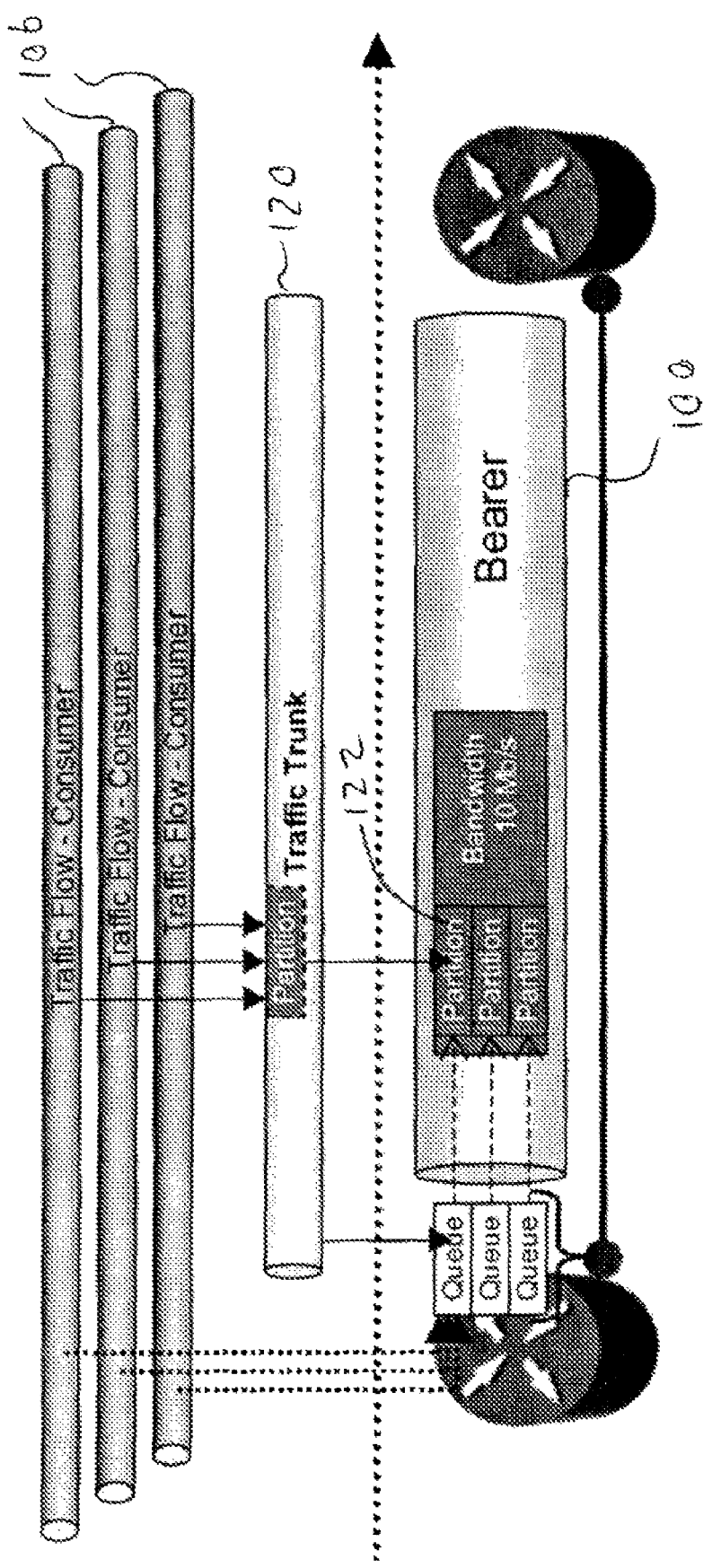

An example is shown in FIG. 3. Here, an MPLS Traffic Trunk 120 has been created between two points in a network with an allocated capacity of 10 Mb/s. Each traffic flow 106 routed on it will utilise a portion of the 10 Mb/s partition 122, that portion being the LBW of the flow. The Traffic Trunk 120 in the example is a consumer of the bearer capacity of bearer 100; in fact, the scheduler has put aside 10 Mb/s for it.

In reality the bandwidth is dynamically consumed by the traffic flows from the bearer capacity: when none of the flows are transmitting traffic, the queue assigned to the Trunk is empty and the bandwidth is used by the other queues.

However, the capacity model provides a logical view in which the Trunk 120 is represented as a logical bearer. The flows 106 then consume bandwidth from the logical bearer allocated for the Trunk. This is graphically represented in FIG. 3 with the bearer bandwidth partition 122 "delegated" to the Traffic Trunk above. Flows logically consume bandwidth from this partition.

Note that in this scenario, bandwidth can be allocated to the Trunk 120 via a dedicated queue on the port, which serves all traffic forwarded on the Trunk, Traffic flows (in this example) cannot reserve bandwidth individually, unless a hierarchical queuing mechanism is implemented in order to create a sub-queue.

However, the capacity model, in modeling the Traffic Trunk as a logical bearer, can provide the administrative mechanism to perform such level of per-flow bandwidth reservation. For example, the model may specify that only traffic flows up to an overall total LBW of say 256 Kb/s can be admitted on the Trunk.

In order for the scenario described above to work, it is normally necessary for the LBW for each of the traffic flows 106 to be ensured in some way. Most networks support a traffic shaping mechanism at the ingress such that the access rate is limited to a value related to the LBW. An example in IP/MPLS is the CAR (Committed Access Rate) traffic engineering function.

Figure 4:
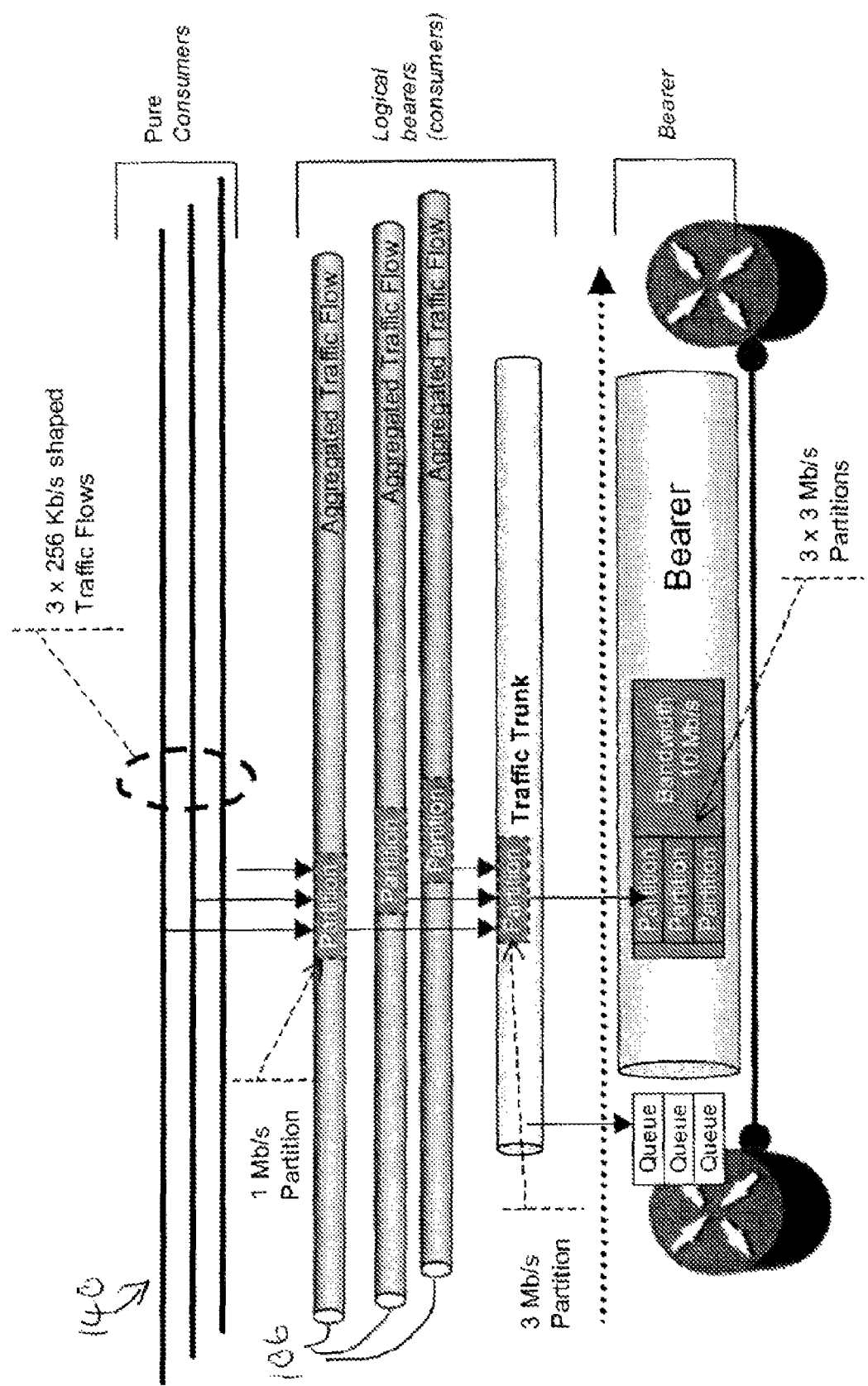

The flexibility of the capacity model's hierarchical framework allows traffic streams at any level in the hierarchy to act as logical bearers. The traffic no flows in the above scenario can be modeled as logical bearers. They could, for example, represent aggregated traffic flows in a core topology, and each of the carried sub-lows could be modeled as a consumer of the aggregated bandwidth. An example of this is shown in FIG. 4, where consumer circuits 140 are all carried on a single one of the (aggregated) traffic flows 106. Thus, partitions need not necessarily be directly associated with queues of a network node, but may instead be associated with other partitions, themselves associated with circuits lower in the circuit hierarchy. This can allow complex capacity models to be constructed.

The current section has illustrated the concepts of bearer, consumer and logical bandwidth within the context of the capacity model. The following section provides further detail and introduces the concept of capacity partitioning.

Capacity Partitioning

The capacity model provides the ability to model the way capacity is partitioned across the network and across layers. A key objective of capacity partitioning is to enable the management of bandwidth resources so as to provide predictable services where QoS can be guaranteed.

As described in the previous section, capacity partitioning can be implemented by way of a scheduler with configurable queues, which is combined with a mechanism to forward packets on the appropriate queue, according to specific criteria. QoS on data networks can be managed using two basic approaches, end-to-end reservation or class based reservation, or more often a combination of the two.

End-to-End Reservation (Per-Flow Reservation)

In end-to-end reservation, a portion of the bandwidth of a bearer is exclusively allocated to a specific traffic stream from its origin to its destination. Packets belonging to that particular stream are recognised as such by the router and forwarded on a dedicated queue at each node along its path. Therefore, if the stream's bandwidth demand does not exceed the bandwidth reserved for the queue, the QoS requirement will be met.

A typical example of this scenario is RSVP (Resource Reservation Protocol) in IP networks, where a Weighted Fair Queue is instantiated on the port and associated with a specific IP flow. The scheduler ensures the bandwidth allocation and all packets belonging to the flow are forwarded on the dedicated queue. It is important to note that an IP flow can be defined without specifying any Class of Service (CoS). Therefore all packets belonging to such a flow are treated equally regardless of their CoS marking.

Figure 5:
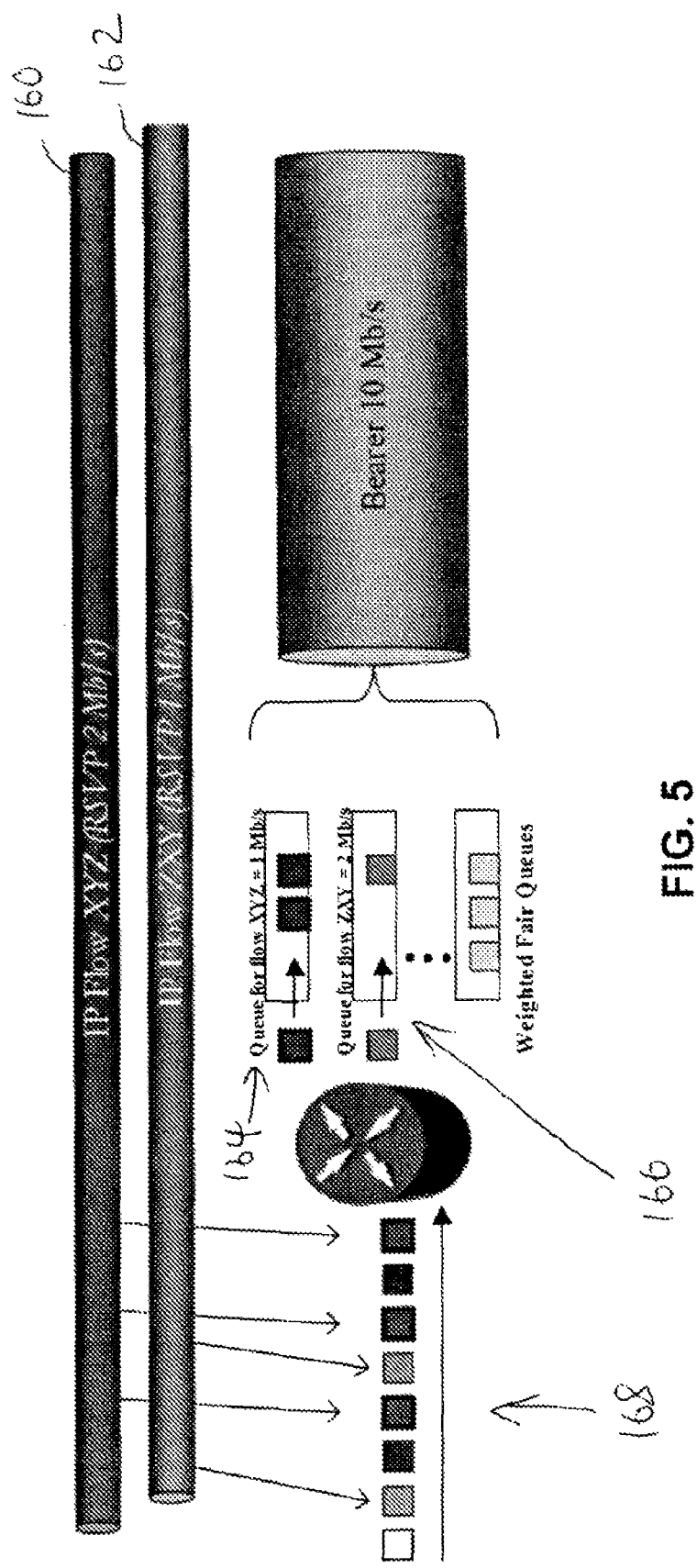

FIG. 5 illustrates this. Packets 168 belonging to the each of the flows 160; 162 are forwarded on a respective one of the queues 164, 166 that RSVP has dedicated for it.

Class Based Reservation

In class-based reservation the packets arriving into a router are inspected to determine which Class of Service they are eligible for, regardless of the flow they belong to. Usually the classification is carried out at the network boundary and the packets are marked so that they carry the class information with them along their journey across the network.

Figure 6:
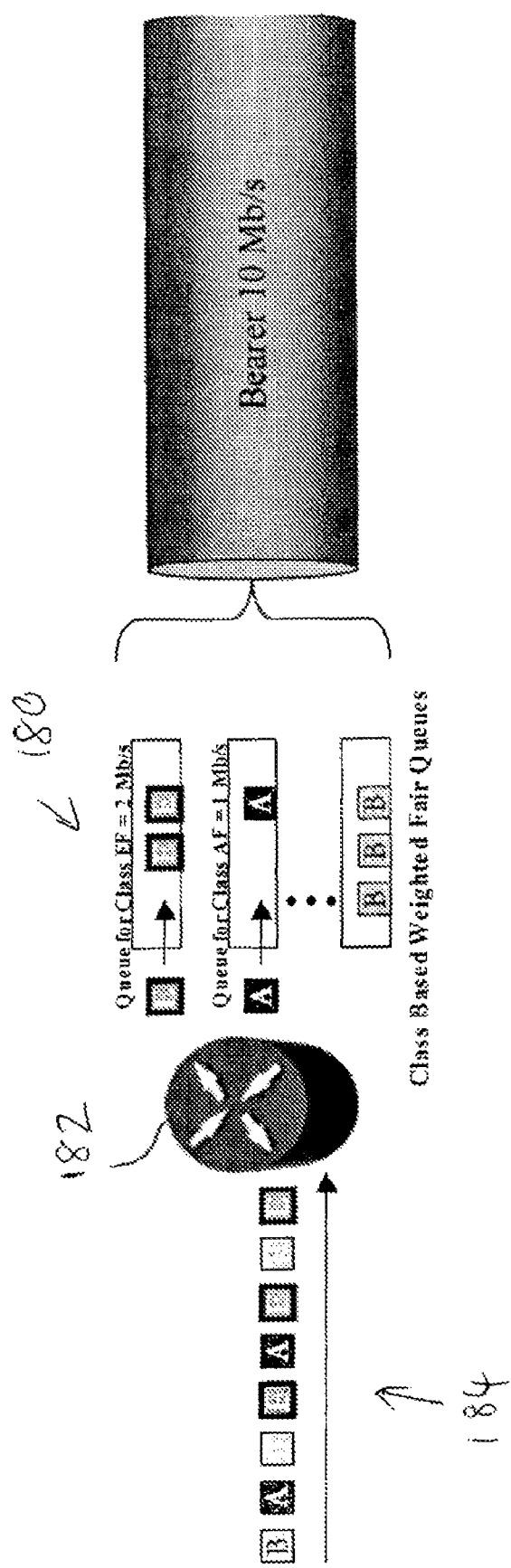

This is illustrated in FIG. 6. A number of queues 180 are configured on the outgoing port of the router 182 with distinct prioritisation and bandwidth allocation in order to provide differentiated treatment to each class. At each hop, packets 184 are forwarded into the appropriate queue 180 depending upon the class they belong to.

In this scenario, the reservation is per class and repeated at each hop. The router does not have any knowledge of the end-to-end flows and it is not interested in the origin or destination of the traffic. Congestion can still occur if, at any given time, the sum of traffic of a given class exceeds the bandwidth allocated for that class. Traffic with higher priority will be served first, however QoS can usually only be guaranteed by traffic engineering mechanisms provided by the network so that the aforementioned condition does not occur.

Partition

The capacity model uses the "Partition" entity to represent a given portion of bandwidth on a bearer circuit, either physical or logical, or on a consumer circuit. The Partition also records information regarding the type and characteristics of the traffic for which the bandwidth has been allocated. For this reason the capacity model supports a configurable set of attributes to be associated with a Partition. The Partition entity is preferably a flexible entity no that plays a slightly different role at the various levels of a data circuit hierarchy.

At the bearer level, a Partition can be implemented as a queue in the scheduler of a transmitting port. It therefore records information such as:

The bandwidth allocated to the queue.

Attributes and characteristics of the queue.

The CoS or other characteristics (such as protocol) of the traffic serviced by the queue.

At the logical bearer level, the Partition represents the reservation of bandwidth from the underlying bearer for the trunk, tunnel or aggregated traffic This reservation can be provided by the technology and be implemented by the network, such as in the case of an RSVP in IP or a PVC in ATM, or can be purely administrative and only exist within the context of the capacity model, without the network being aware of it.

In this role, the Partition records information such as:

Reserved/allocated bandwidth (which is consumed from the underlying bearer) or the traffic parameters to calculate it.

CoS of the trunk, tunnel or aggregated traffic.

For tunnels, the CoS or other characteristic of the traffic carried by the tunnel. For example, a CBR ATM PVC configured to tunnel IP traffic with an 'Express Forwarding' CoS.

A Partition at the pure consumer level, i.e. that does not serve overlying circuits in the hierarchy, represents the required bandwidth, or LBW, for the traffic flow. It is the portion of bandwidth logically or physically reserved from the underlying layer to carry the traffic between the two end-points of the Circuit.

A consumer circuit can be modeled with one or more Partitions. Each Partition represents a portion of the traffic with distinct characteristics.

A consumer Partition records information such as:

Consumed bandwidth (LBW) or traffic parameter to calculate it.

The Class of Service of the traffic represented by the Partition.

Attributes and characteristic of the traffic flow.

A pure consumer circuit typically represents the service layer, where each Partition represents the reserved bandwidth for each QoS delivered by the service with all the associated service parameters.

For example, a VPN service could be modeled to represent the bandwidth dedicated to each type of traffic that receives differentiated treatment. This is illustrated in FIG. 7.

Figure 7:
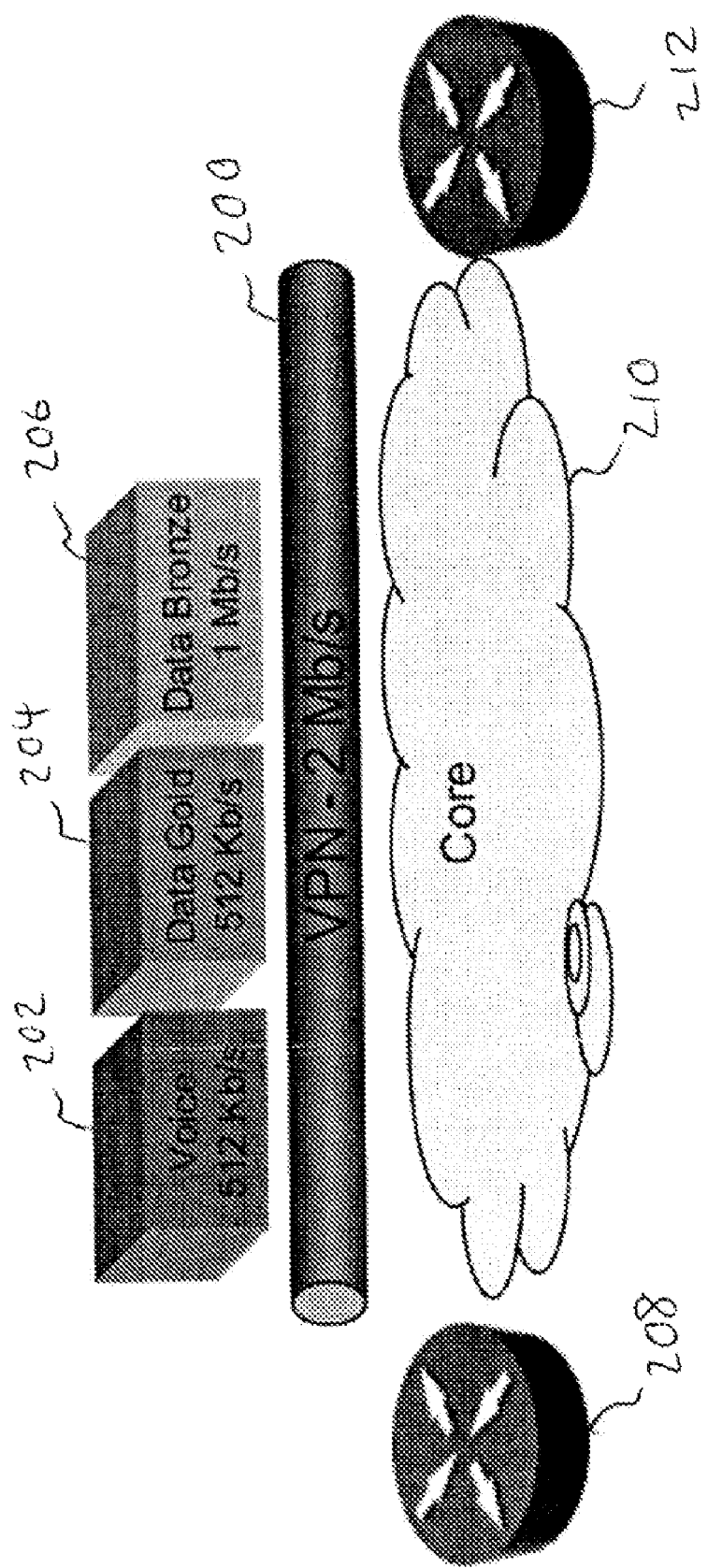

In the example of FIG. 7, the VPN circuit 200 is used to represent the VPN service between two customer devices 208, 212 across network 210, the service provides differentiated bandwidth allocation and treatment to three types of traffic, represented as partitions 202, 204 and 206.

For any partition, the partition bandwidth can be configured to represent either Kb/s, Mb/s or Cells/s. In cases where the partition bandwidth needs to be mapped to a bandwidth of another unit, or to a static timeslot bandwidth, the capacity model performs the bandwidth calculation (taking account of overbooking and adaptation factors where applicable).

Attributes

The capacity modes provides a flexible model to record Partition information that can be preconfigured by way of a set of uniquely named attributes, whose value is set when the Partition is instantiated.

Service Class

As illustrated in the previous section the class of service information, often referred to as CoS, plays a different role in the model depending upon the technology and layer in the circuit hierarchy.

At the bearer level the Partition purely represents a chunk of bandwidth allocated to a queue, therefore a single CoS is typically not an appropriate attribute for the Partition. Rather, the Partition is associated with a series of CoS values that represent the classes of traffic forwarded on the queue.

The Partition of a consumer, on the other hand, represents more closely the traffic carried within the allocated bandwidth. In this case the CoS attribute specifies the class of service assigned to the traffic of the Partition.

The Partition of a logical bearer fulfills both roles of consumer and bearer and for this reason can have a CoS assigned to it as a consumer and a series of related CoS values that define the class of traffic carried by it as a bearer.

A typical example of this is a "tunnel" Circuit, where a packet of the tunneling stream is marked with a distinct CoS from the packet that is being tunneled in its payload.

Figure 8:
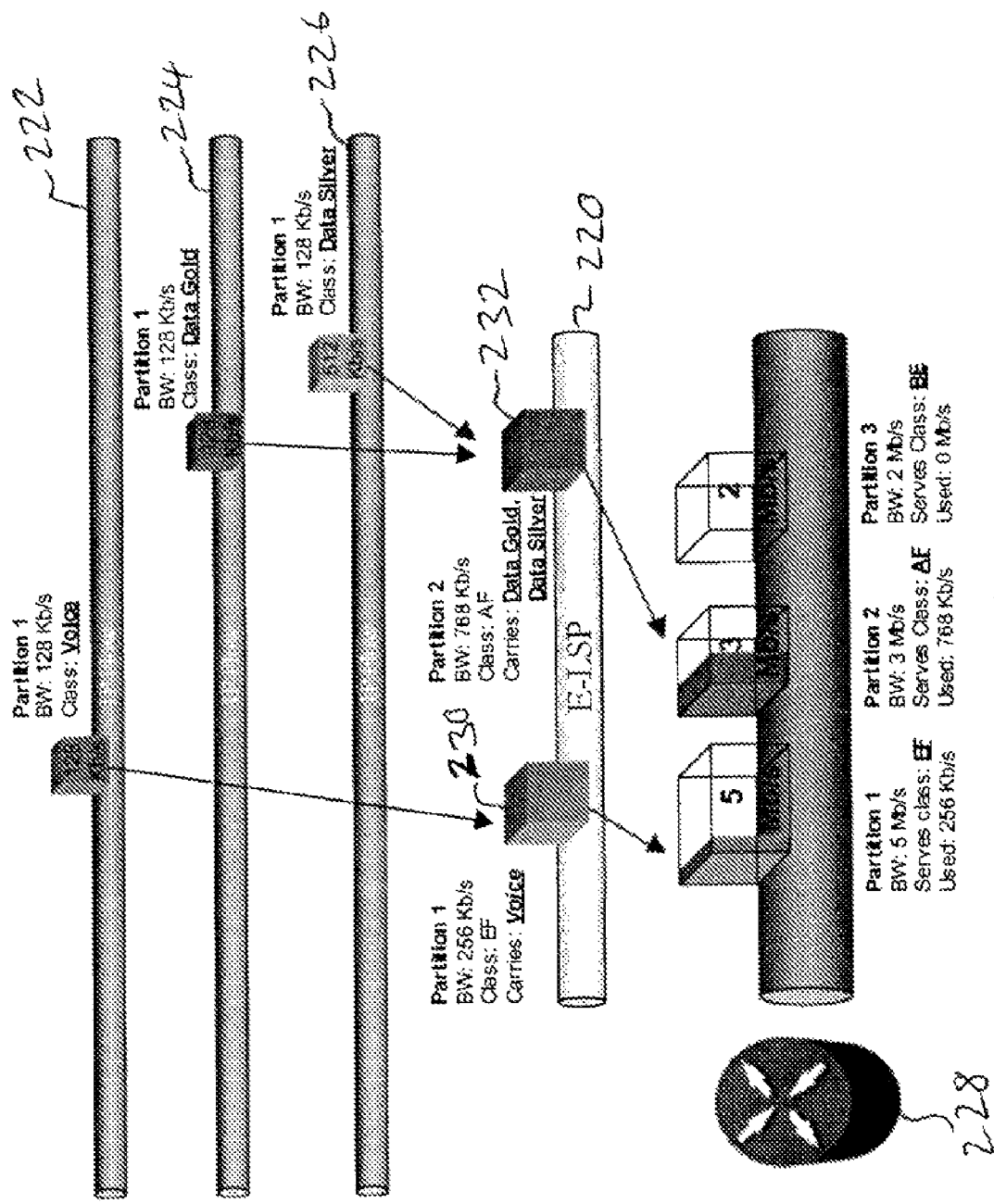

FIG. 8 illustrates an MPLS E-LSP (EXP-inferred label-switched path) tunnel 220 that carries traffic of Voice 222, Data Gold 224 and Data Silver 226 service classes. The packets arriving at the router 228 are classified and forwarded onto the E-LSP 220 with one of two possible DSCP (Differentiated Services Code Point) values: EF for Voice and AF for Data. Data packets belonging to the IP Flows receive differentiated treatment along the path of the tunnel according to the DSCP in the MPLS shim header and not according to the class of the IP packet itself.

This scenario is represented in the model with the E-LSP 220 having Partitions 230, 232 with the assigned service class that represents the DSCP in the MPLS label and the list of "carried" service classes, The bandwidth allocation for the two Partitions 230, 232 of the E-LSP 220 might be purely administrative or actually implemented by the network, although equipment vendors currently do not support multiple bandwidth allocation for a single E-LSP.

Figure 9:
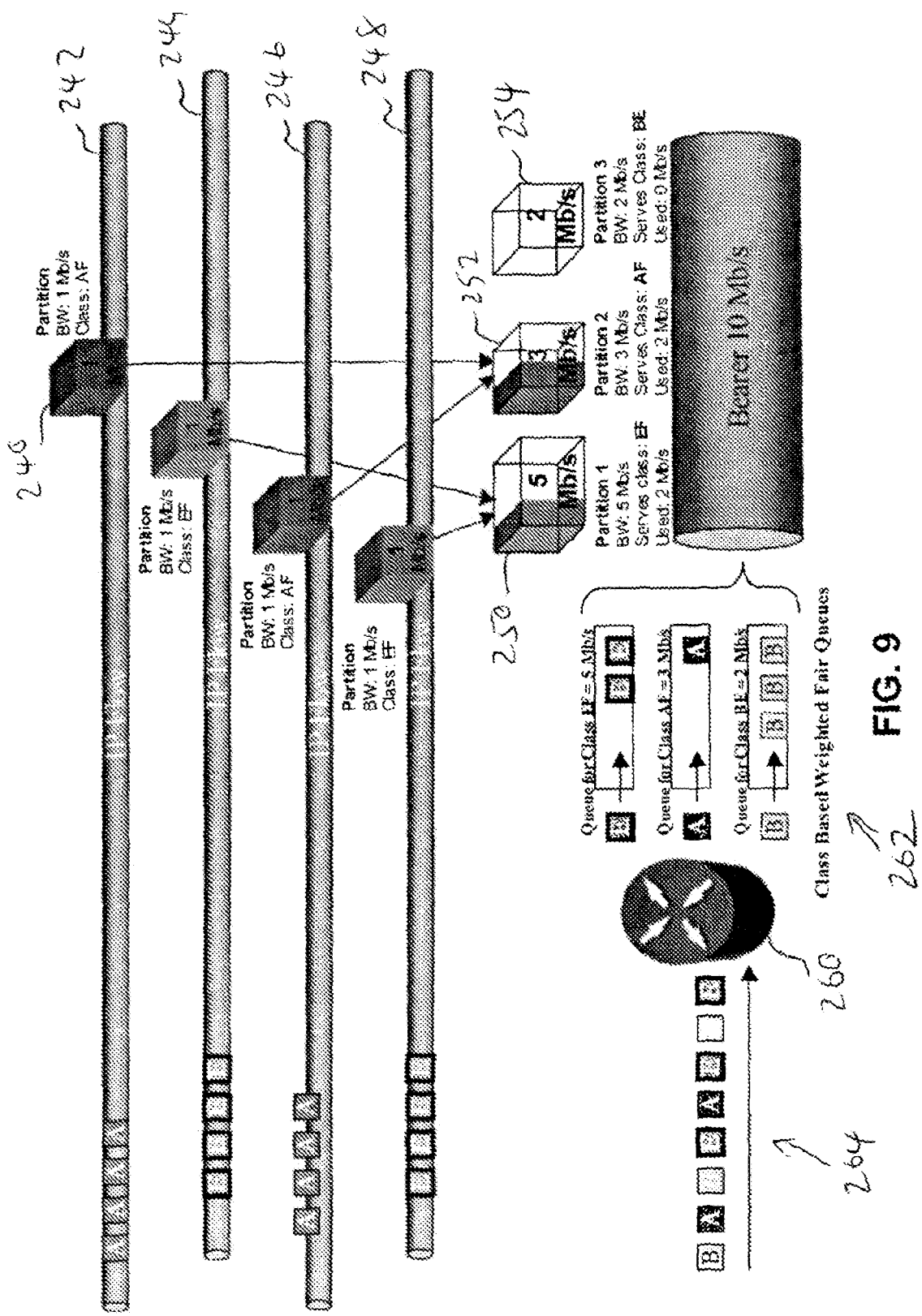

FIG. 9 is an example of class-based reservation and shows how an IP bearer configured to carry DiffServ (differentiated services) traffic is modeled in the capacity modes. The IP Flows 242, 244, 246 and 248 represent the consumers in this hierarchy. The traffic of each flow is represented in the model by a single Partition (e.g. Partition 240), related to one of the bearer Partitions 250, 252, 254. The relationship is established according to the corresponding CoS.

Class-based reservation is supported by the network in the following way.

As part of the implementation of the network policy, a class-based scheduler is configured on the router 260 where the total capacity of a 10 Mb/s bearer has been divided in three Partitions 250, 252, 254 of 5 Mb/s, 3 Mb/s and 2 Mb/s, corresponding to the three queues 262 configured on the port. Each Partition is assigned a CoS or set of CoS which determine which traffic classes the corresponding queue will service.

The incoming packets 264 belonging to each individual flow are inspected by the router 260, which forwards them on one of the three queues 262 depending upon the DiffServ Code Point (DSCP) found in the header of the packet. The DSCP defines the CoS of the packet.

Each IP Flow 242, 244, 246, 248 has one Partition that represents the expected bandwidth utilization (LBW) and the CoS carried. For each IP Flow, the LBW is associated with the appropriate bearer Partition 250, 252, 254, and subsequently the capacity model can calculate the overall utilization of the bearer queues across all flows in the bearer (in the drawing, the utilisation of the bearer partitions is illustrated by partial filling of the boxes 250, 252, 254 representing the bearer partitions).

When provisioning a new IP Flow, the capacity model provides verification functions to enable the verification of whether the bandwidth can be supported by the network, based on bearer bandwidth availability and other criteria described below.

Figure 10:
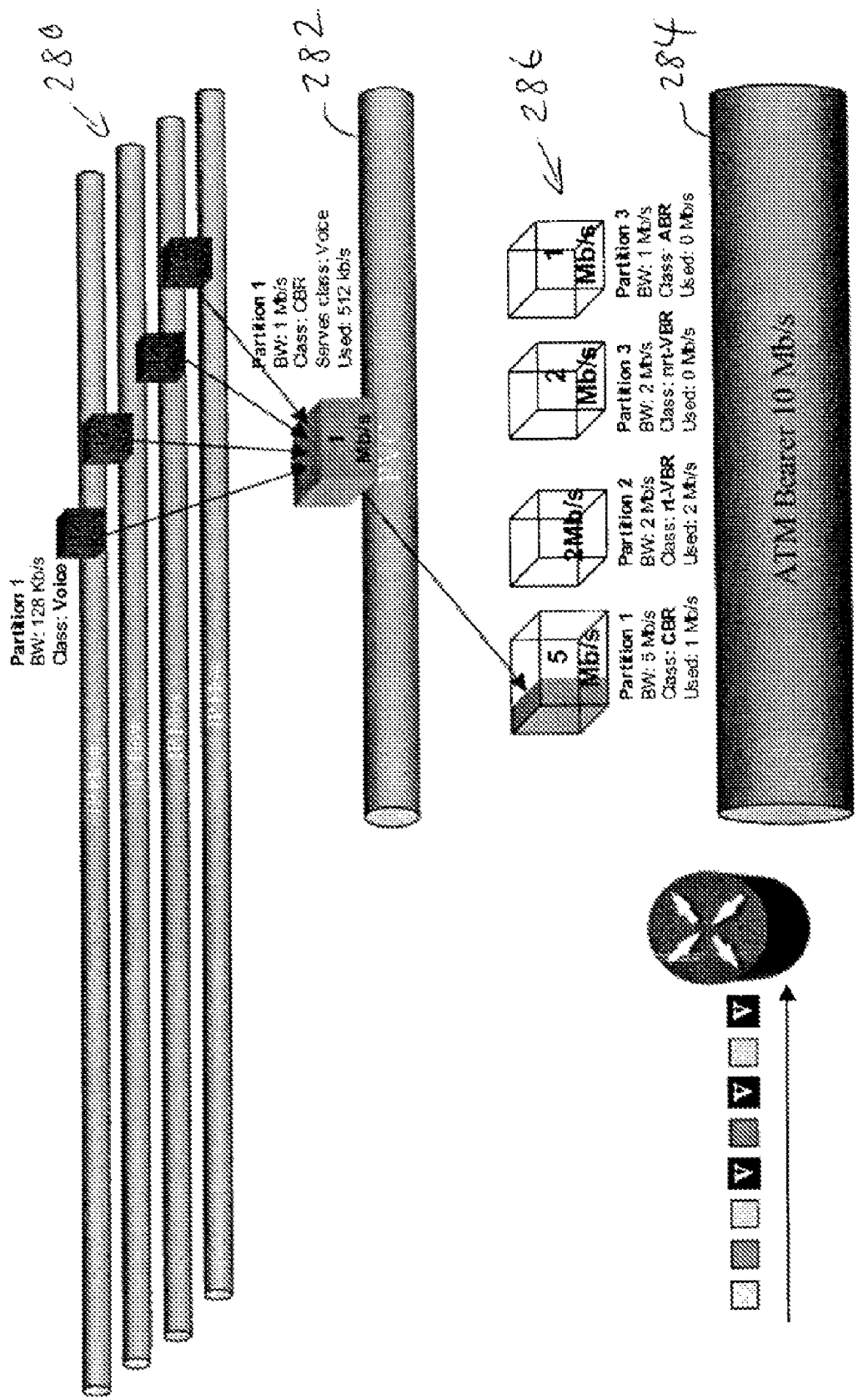

FIG. 10 shows a more complex scenario, where IP flows 280 are routed over a Constant Bit Rate ATM PVC 282. In this case the PVC 282 consumes bandwidth from the ATM bearer 284 and, at the same time, provides bandwidth for the IP Flows 280, i.e. It acts as logical bearer.

The bearer circuit 284 has 10 Mb/s bandwidth which is divided in four Partitions 286, each one representing a different ATM Service Category, with distinct bandwidth allocation.

The PVC is represented by a circuit with a single Partition of 1 Mb/s of LBW with "CBR" CoS. The PVC CoS is used to attribute the LBW to the appropriate bearer queue.

The consumer IP Flows 280 are modeled with one Partition each, representing the "Voice" type of traffic which they carry, with an LSW of 128 Kb/s. The LSW is consumed from the PVC 282 that acts as logical bearer.

Transparent Layers

From the capacity management standpoint, a logical bearer represents an intermediate layer in the circuit hierarchy, where some bandwidth has been allocated administratively by the capacity model and eventually reserved by the network itself (via signaling).

There are scenarios however where the intermediate layer only acts as a routing object, and bandwidth is not in fact reserved in the network. This is the case, for example, in the case of a Label Switch Path (LSP) in MPLS, which can be instantiated in the network without any bandwidth allocation, or an ATM VCNP layer for modeling ATM numbering. These layers in the circuit hierarchy do not participate in bandwidth management and are referred to herein as transparent layers.

Similar scenarios can be envisaged when modeling tunneling or flow aggregation where the path is known, but no network bandwidth allocation is possible or desired at this level. The capacity model provides two approaches to support these scenarios.

Figure 11:
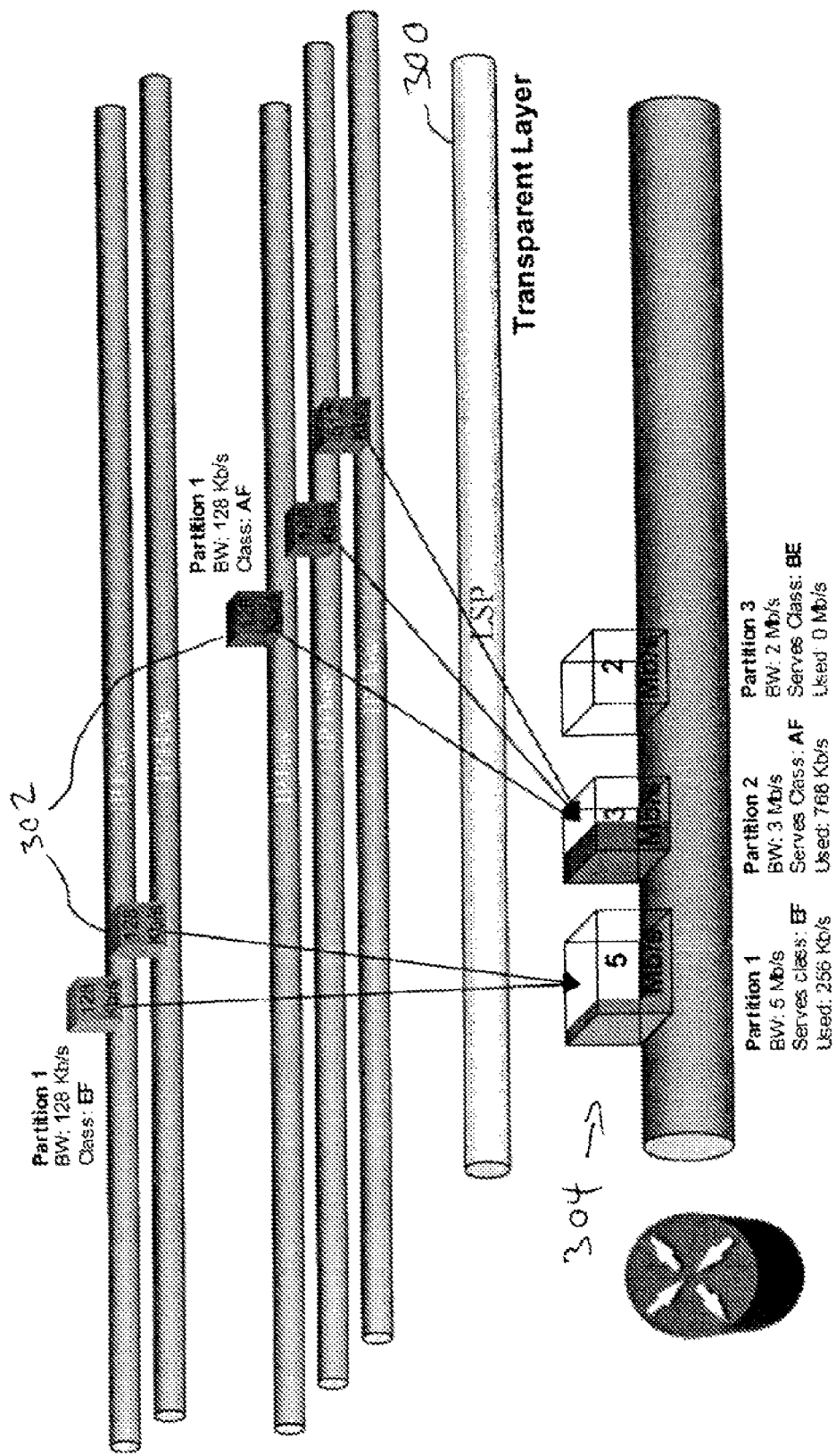

In the first method, the circuit is modeled without Partitions and no bandwidth notion is associated with the circuit—it therefore represents a transparent layer (or transparent circuit). This is illustrated in FIG. 11, which shows a circuit hierarchy where an MPLS LSP 300 is modeled as a transparent layer. Partitions 302 of the overlying circuits are directly related to the bearer layer Partitions 304, bypassing the transparent layer 300.

In the second modeling approach the circuit that represents the tunnel or the aggregated flow is still considered a logical bearer, configured with one or more Partitions whose bandwidth is dynamically calculated as the sum of the bandwidth of the overlying consumers.

Every time a new overlying consumer is added or deleted the LBW of the logical bearer Partition is increased or decreased accordingly and the new value is used to update the bandwidth consumption from the underlying bearer.

This type of logical bearer is referred to herein as a transparent logical bearer, because it retains its role of logical bearer and is modeled in the capacity model with Partitions, but it does not have a set negotiated bandwidth that has been allocated by the network. In this case the Partition is referred to as a transparent Partition.

For clarity, a logical bearer that is modeled with Partitions as described in the previous section, may be referred to as opaque.

Figure 12:
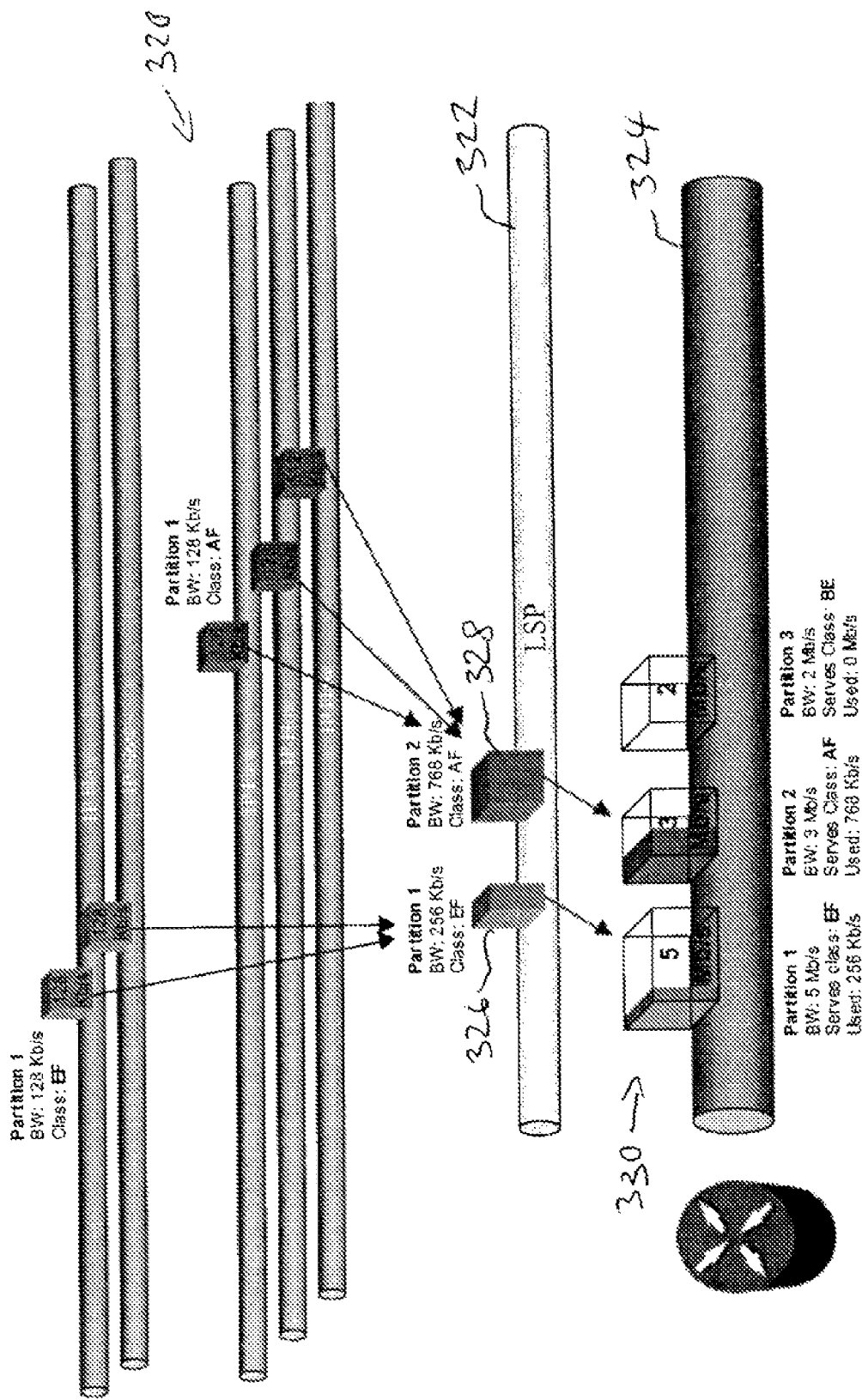

The use of a transparent logical bearer is illustrated in FIG. 12, where IP Flows 320 of different Classes of Service are routed over an LSP 322.

The LSP 322 routes traffic of two DSCPs onto the underlying bearer 324 and is therefore modeled with two Partitions 326, 328. The LBW of these Partitions is dynamically calculated as the sum of the IP Flows 320 of the corresponding Class and the capacity consumption is applied on the appropriate Partitions 330 of the physical bearer 324.

The capacity model preferably supports any combination of opaque, transparent layers, and transparent logical bearers in the Circuit hierarchy. Since transparent bearers are generally not relevant in assessing bandwidth, when controlling whether a service is allowed to use particular bearer, the capacity model searches down to the first opaque bearer encountered, where the capacity is assigned.

TDM Bearers

Figure 13:
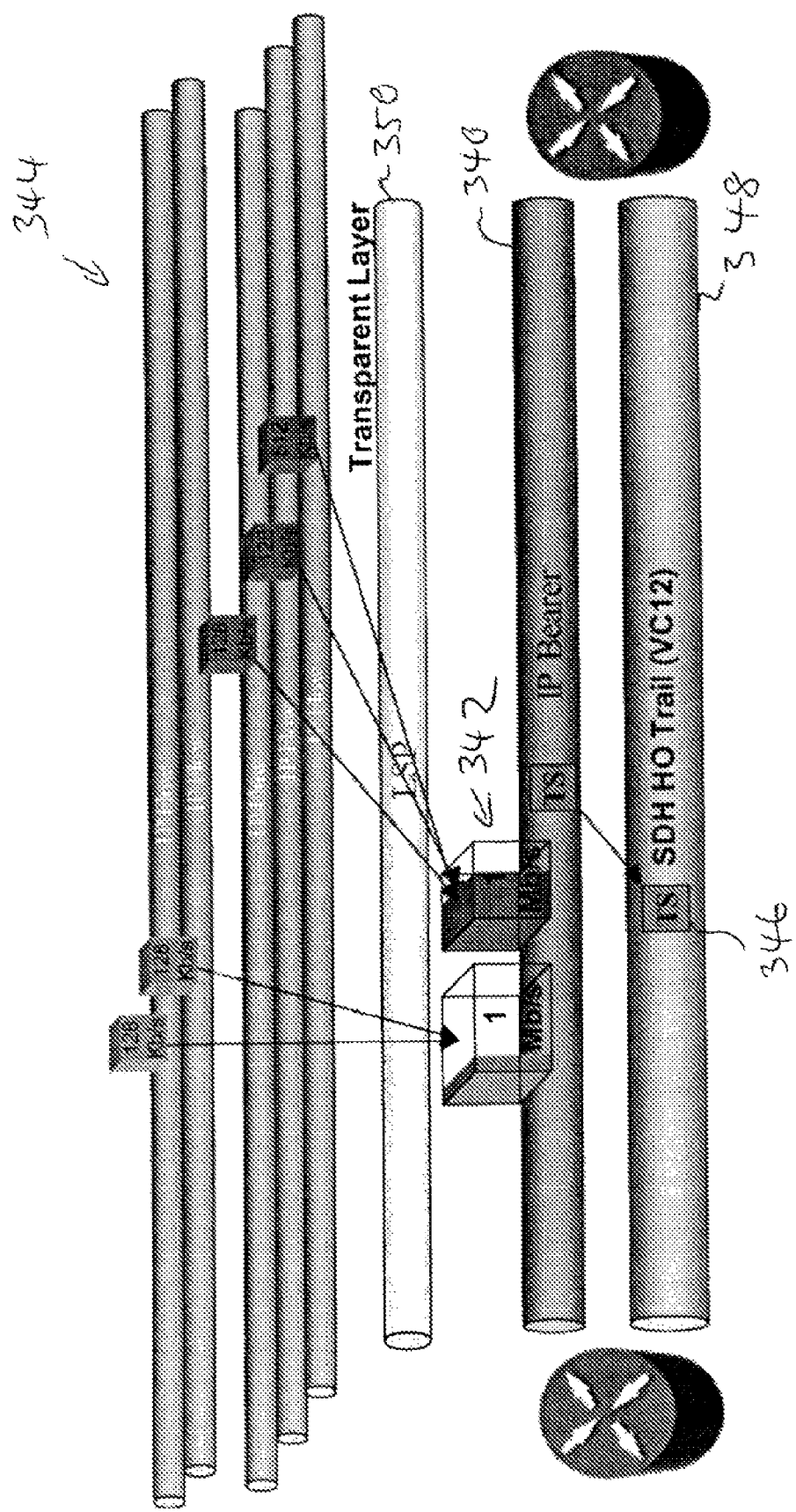

The bearer capacity for data circuits can be provided by a TDM circuit. In this case the bandwidth of the data Circuits is consumed from one of the timeslots of the underlying TOM circuit. To support this scenario the capacity model allows the bearer data Circuit to be modeled with a single timeslot in addition to the partitioning configuration. This is illustrated in FIG. 13, where IF bearer 340 comprises Partitions 342 supporting IP flows 344. The IP Bearer 340 itself is assigned to a timeslot 346 on TOM circuit 348. The model includes a transparent layer 350.

TDM Over Data Circuits

The capacity model supports the modeling of TOM Circuits that are routed on top of data circuits. In this case, the entire capacity for the TDM circuit is provided by one of the Partitions of the underlying data circuit. The capacity model preferably does not directly model the mapping between the timeslots and the underlying Partition, but the Partition itself relies on the relationship with the overlying TOM circuit to update the bandwidth utilization.

Booking and-Overbooking

One of the main roles of the capacity model is to ensure that the bandwidth is properly managed, in particular that when a new circuit is created there is enough capacity available to support it.

Whenever a consumer circuit is created, its Partition should be resolved on the Partitions of the bearer circuits that support it. This relationship ensures that the capacity model can perform the appropriate consumption calculation to verify bandwidth availability and update the utilization of the bearers. This is the centralised "admission control" function of the capacity model. The capacity model can prevent over-utilisation of a bearer partition by not allowing a requested allocation that would result in over-utilisation and/or by providing an alert to the user requesting the allocation.

However, in order to take advantage of the statistical multiplexing nature of data networks, the capacity model preferably makes it possible to reserve, i.e. "book", for consumers more bandwidth than is actually made physically available by the bearer, in a controlled manner.

For example, a bearer of 10 Mb/s could be configured to support 15 Mb/s of consumer traffic. This condition is also called overbooking. Overbooking is based on the assumption that not all consumers constantly transmit packets at their maximum and negotiated rate (referred to as the LBW in the capacity model).

This behaviour is allowed by providing a booking factor attribute in the Partition entity in the model, by way of which an allowed degree of overbooking can be specified For example, a 10 Mb/s bearer Partition with a booking factor of 1.5 can accept 15 Mb/s of consumer Partitions' LBW.

Figure 14:
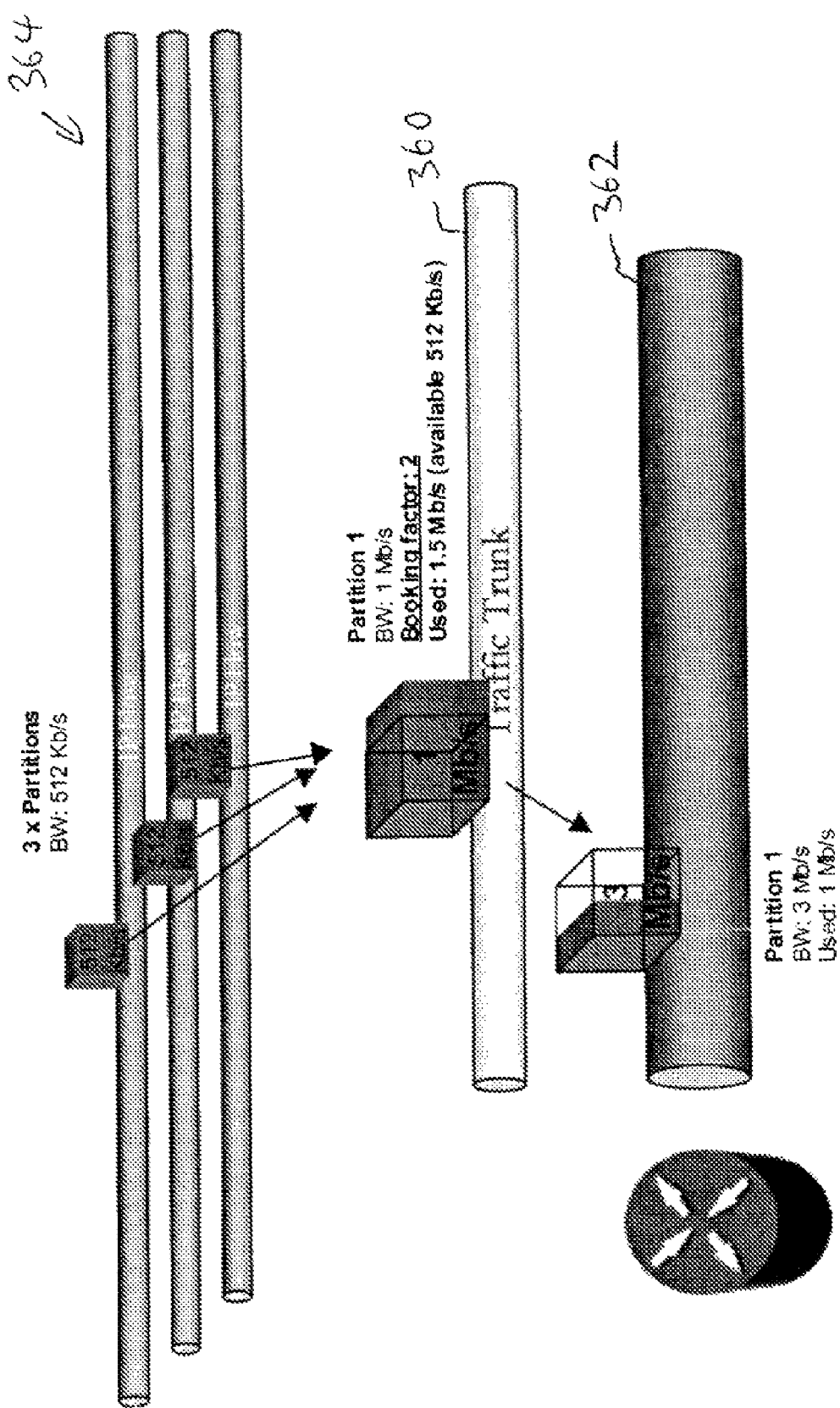

FIG. 14 shows an example of overbooking where the logical bearer represented by the Traffic Trunk 360 is configured with a booking factor of two. Therefore, its capacity is considered as double the 1 Mb/s bandwidth allocated from the underlying physical bearer 362. The diagram shows three IP Flows 364 policed at 512 Kb/s using the Traffic Trunk 360, leaving 512 Kb/s of available bandwidth on the bearer 362.

A booking factor less than 1 can be used to specify an under-booking condition, where the bandwidth that can be reserved by consumer Partitions is less than the bearer Partition bandwidth. This can be a desirable scenario when some bandwidth of the bearer is required to be left free for out-of-band traffic, control traffic, best effort traffic or in general traffic that is not modeled in the capacity model.

A Partition that carries traffic in excess of what is allowed by its booking factor is considered over-utilised. The capacity model provides an over-utilization flag for circuits which is set to true as soon as any of the Partitions of a circuit reach this condition. Again, the user can also be alerted when requesting an allocation which would result in over-utilisation, and the system may be configured not to process allocations which would result in over-utilisation.

Hierarchical Partitioning

Bandwidth partitioning as illustrated above allows a flexible division of bearer bandwidth for differentiated treatment of consumer traffic. The capacity model extends this flexibility by providing support for hierarchical partitioning. In hierarchical partitioning the bandwidth represented by a (parent) partition can be further subdivided in sub-partitions or child partitions. It should be noted that this is distinct from the association of a consumer partition with a bearer partition from which the consumer partition consumes its bandwidth. The parent partition in a partition hierarchy is referred to herein as a group partition.

Figure 15:
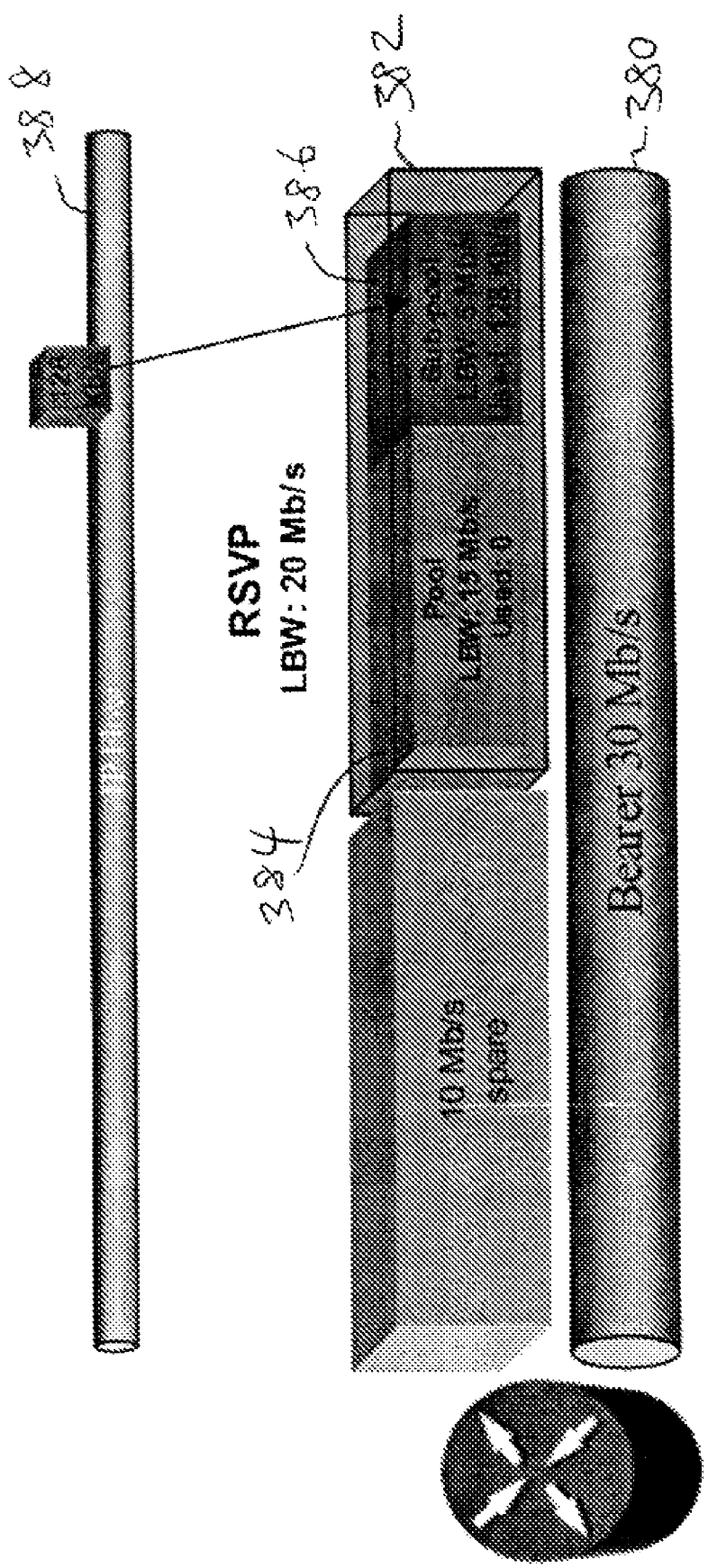

The example depicted in FIG. 15 shows a bearer 380 where 20 Mb/s have been allocated for RSVP traffic flows. The RSVP protocol provides two reservation styles, namely Pool and Sub-pool, where the traffic reserved as Sub-pool has priority over the one reserved as Pool. This is modeled by the partition hierarchy shown in FIG. 15, where a group Partition 382 of 20 Mb/s is sub-divided into two child Partitions 384 and 386 of 15 Mb/s and 5 Mb/s respectively, which represent Pool and Sub-pool allocations. The bandwidth for the IP Flow 388 in this example has been reserved from the Sub-pool Partition 386.

The LBW of the group partition should normally be equivalent to the sum of the LBW of its child partitions. In preferred embodiments, booking factors are not applicable to group partitions. Consumer Partitions are resolved against the "leaf" Partitions of the bearer, i.e. non-group partitions of the partition hierarchy.

Figure 16:
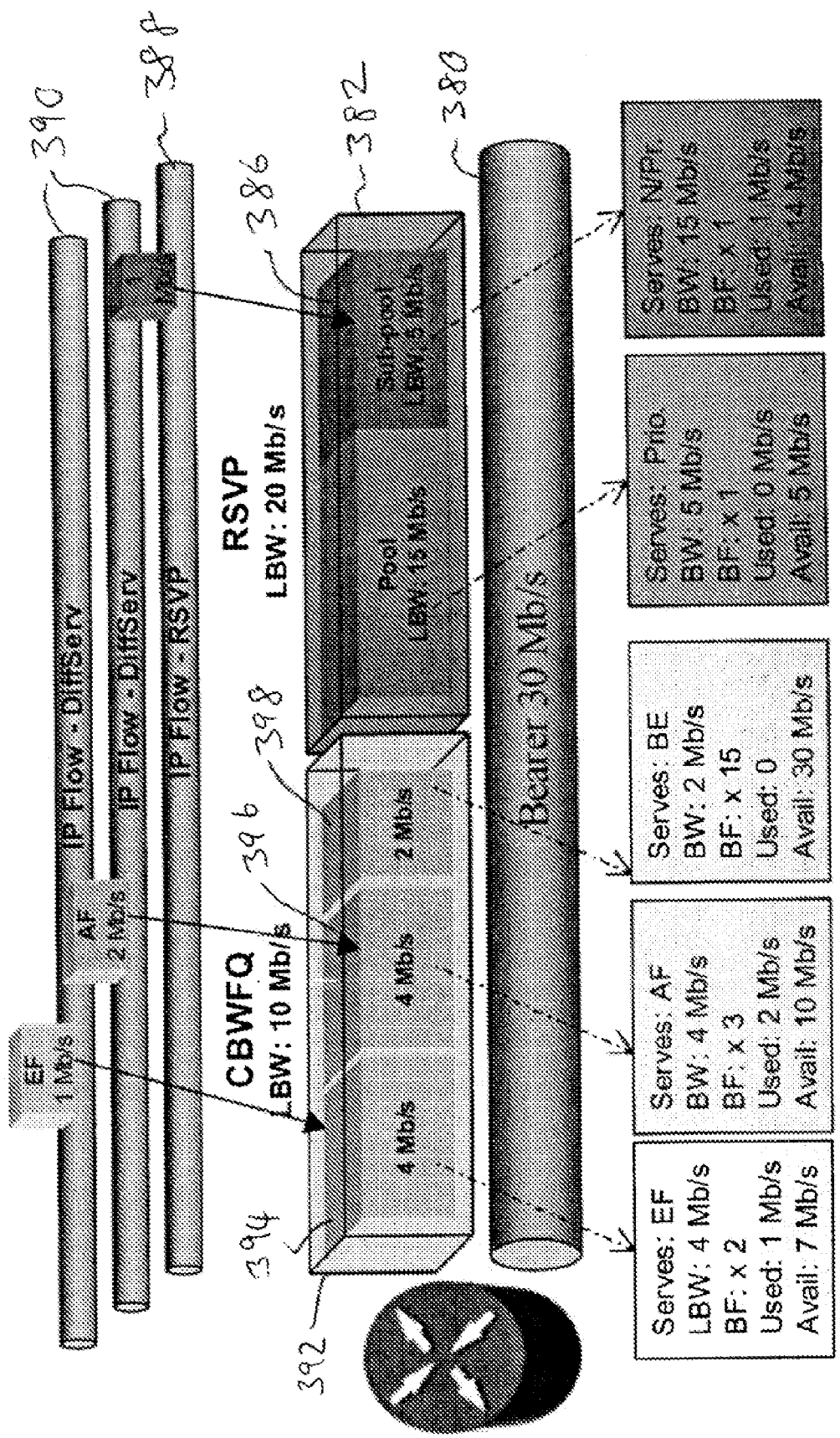

The model of FIG. 15 has been expanded in FIG. 16, where the 10 Mb/s spare capacity of the bearer 380 has been configured for Class Based Weighted Fair Queuing using group Partition 392. In order to add support for differentiated treatment of DiffServ traffic.

The newly added group Partition 392 is subdivided into three leaf Partitions 394, 396, 398 of 4 Mb/s, 4 Mb/s and 2 Mb/s respectively, and allocated for Expedited Forwarding (EF), Assured Forwarding (AF) and Best Effort (BE) traffic classes respectively. However, each of these Partitions is configured with a distinct booking factor (2, 3 and 15 respectively), providing an adjusted capacity for each traffic class of 8 Mb/s, 12 Mb/s and 30 Mb/s respectively of consumer traffic. Two new consumer circuits 390 have been created, the first carries EF traffic of 1 Mb/s LBW, the second carries AF traffic of 2 Mb/s LmW.

Note that the partitioning configuration in the scenario above reflects the port configuration of the transmitting port of the router. However, while the leaf Partitions in CBWFQ represent the queues of the scheduler, the leaf Partitions of the RSVP group represent a bandwidth reservation assigned to the RSVP protocol. The flow-based queues, which support RSVP, are dynamically created when a resource reservation is signalled on the port and need not be modeled individually.

In preferred embodiments, sub-partitions inherit attributes of parent partitions, such as the class of service, traffic type, and quality of service attributes, but may also represent a refinement of such attributes, in addition to representing a refinement of the bandwidth allocation. For example, child partitions may represent a service sub-class or sub-selection of service classes (e.g. realtime (rt) and non-realtime (nrt) child partitions of a VBR traffic partition). In another example, two child partitions may have different overbooking factors associated with them (e.g. a 10:1 overbooked 1 Mbps child partition and a 2:1 overbooked 1 Mbps child partition, resulting in a total logical bandwidth of 10 Mbps+2 Mbps=12 Mbps, supplied on a 2 Mbps bearer partition, for an effective overbooking factor of 6:1 overall for the group partition, though this need not be explicitly specified in the model). In other words, child partitions can further qualify class of service quality of service and bandwidth attributes of the parent partition.

Directionality

A Partitioning scheme ultimately reflects how the bandwidth is being managed at the outward facing port of a device, i.e. at the transmission point, no where queuing and scheduling mechanisms are configured.

Data network connection entities are often unidirectional, such as ATM PVCs or MPLS LSPs. In the capacity model, a partitioning configuration represents how the bandwidth has been divided for the traffic going in one direction. Bidirectional circuits, such as ADSL connections, are configured with two independent partitioning configurations, one for each port of the circuit.

Figure 17:
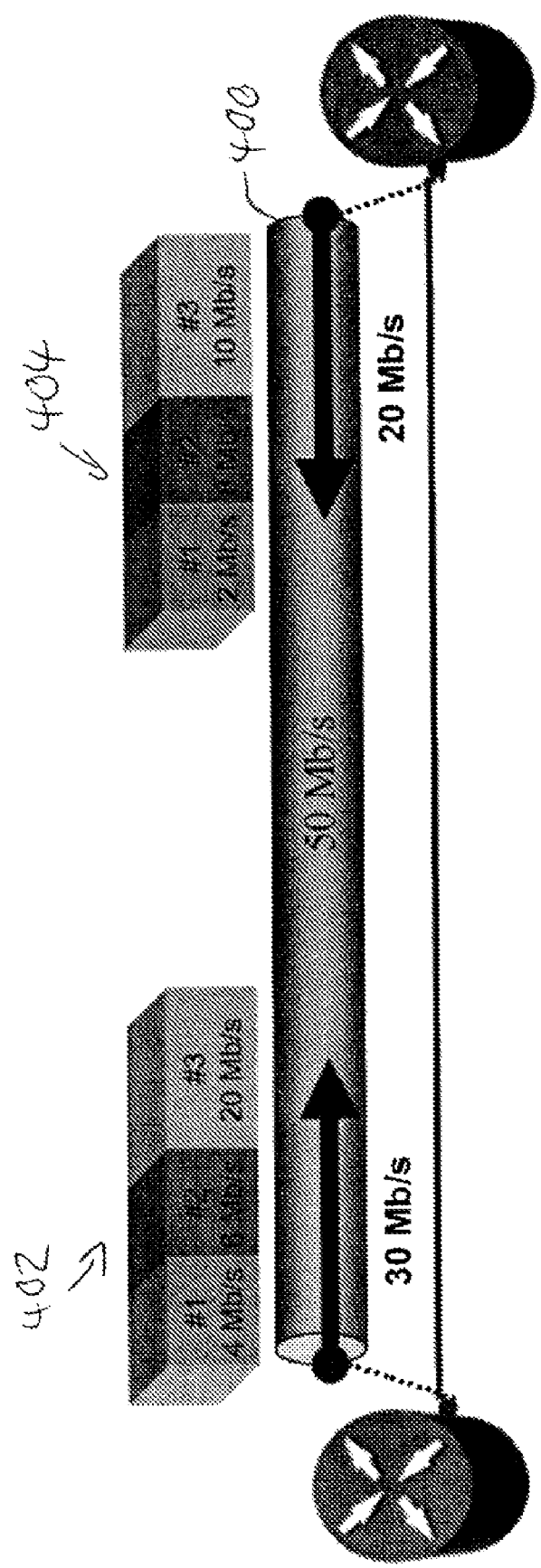

The capacity model establishes a relationship between the partitioning configuration and the transmitting end-point of the circuit. This concept is illustrated in FIG. 17. Here, the sum of the LW in each direction (represented by partitioning 402 and 404 respectively) should generally not exceed the total bandwidth of the data circuit 400 for both directions.

Traffic Mapping

Traffic mapping refers to the relationship between a consumer Partition and a bearer Partition. This relationship represents the part of the router configuration that regulates on which queue the traffic of a consumer is forwarded. In the model, this information is associated with the bearer Partition.

In the example of FIG. 181 bearer Partitions 422 record explicit traffic mapping information that specifies the type of consumer Partition that they are entitled to service based on the CoS of the consumer. When a new IP Flow 424 is created in the inventory and routed on the IP bearer 420, the capacity model maps the consumer Partition (e.g. 426) on the appropriate bearer Partition, as specified in the explicit Traffic Mapping configuration.

In preferred embodiments, the capacity model also supports traffic mapping on parallel bearers. This is required whenever the traffic of a flow between two points is shared across multiple, parallel paths. Load balancing is a typical example of such scenario.

Figure 18:
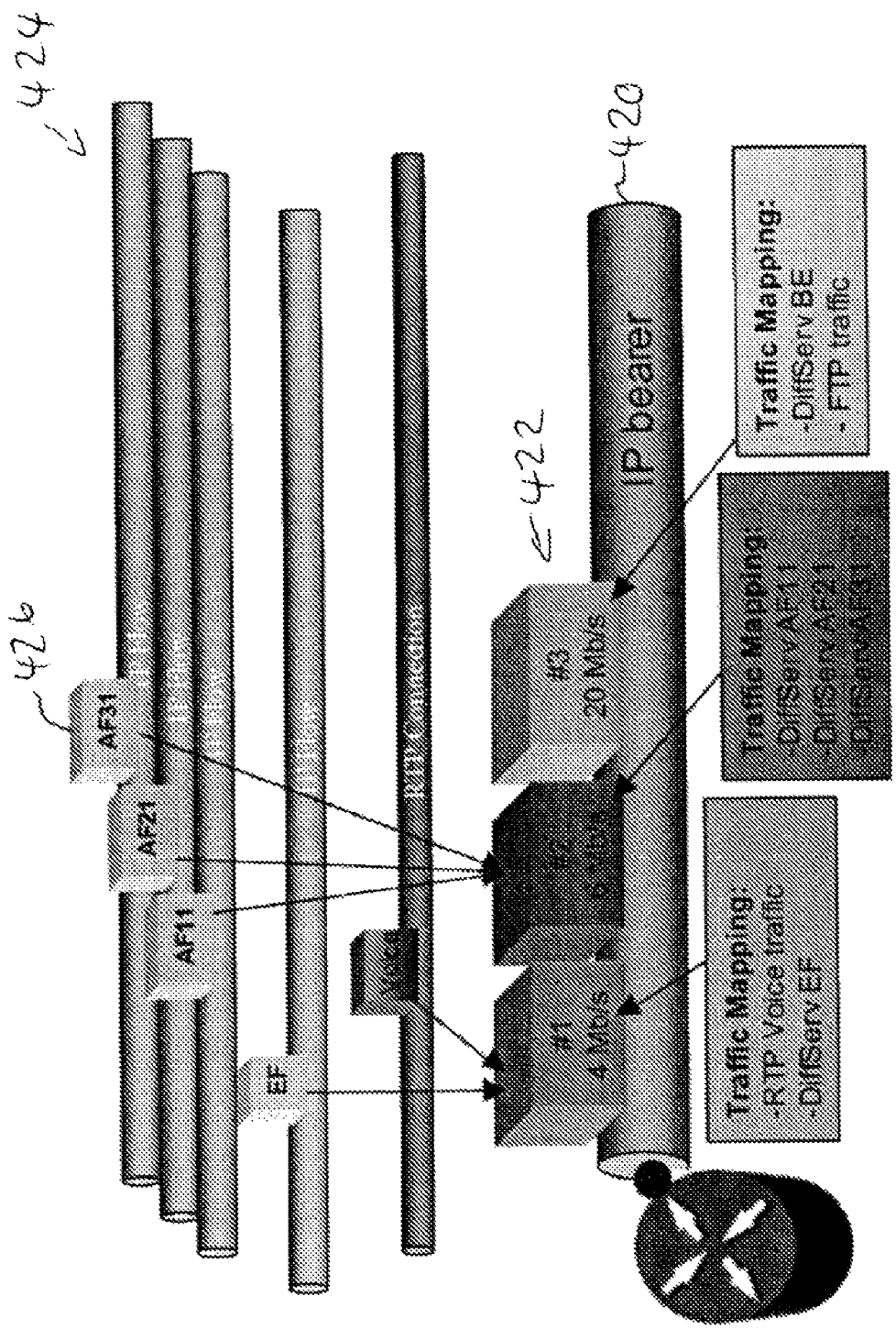

In the example of FIG. 18, a single Partition supports a number of different types of consumer traffic. This reflects a typical IP router configuration where packet streams of more than one class and protocol type are forwarded on one queue, receiving the same treatment and sharing the same bandwidth allocation.

There are scenarios, however, where this flexibility is not required or not provided by the technology. In ATM for example, there are a fixed number of Service Categories and the scheduler is configured to provide differentiated treatment to consumer PVCs according to their Service Category only. In such cases, the Traffic Mapping is preferably implicit in the Service Categorization, (more generally, this may be the case where the available classes of service are determined by the underlying technology).

Figure 19:
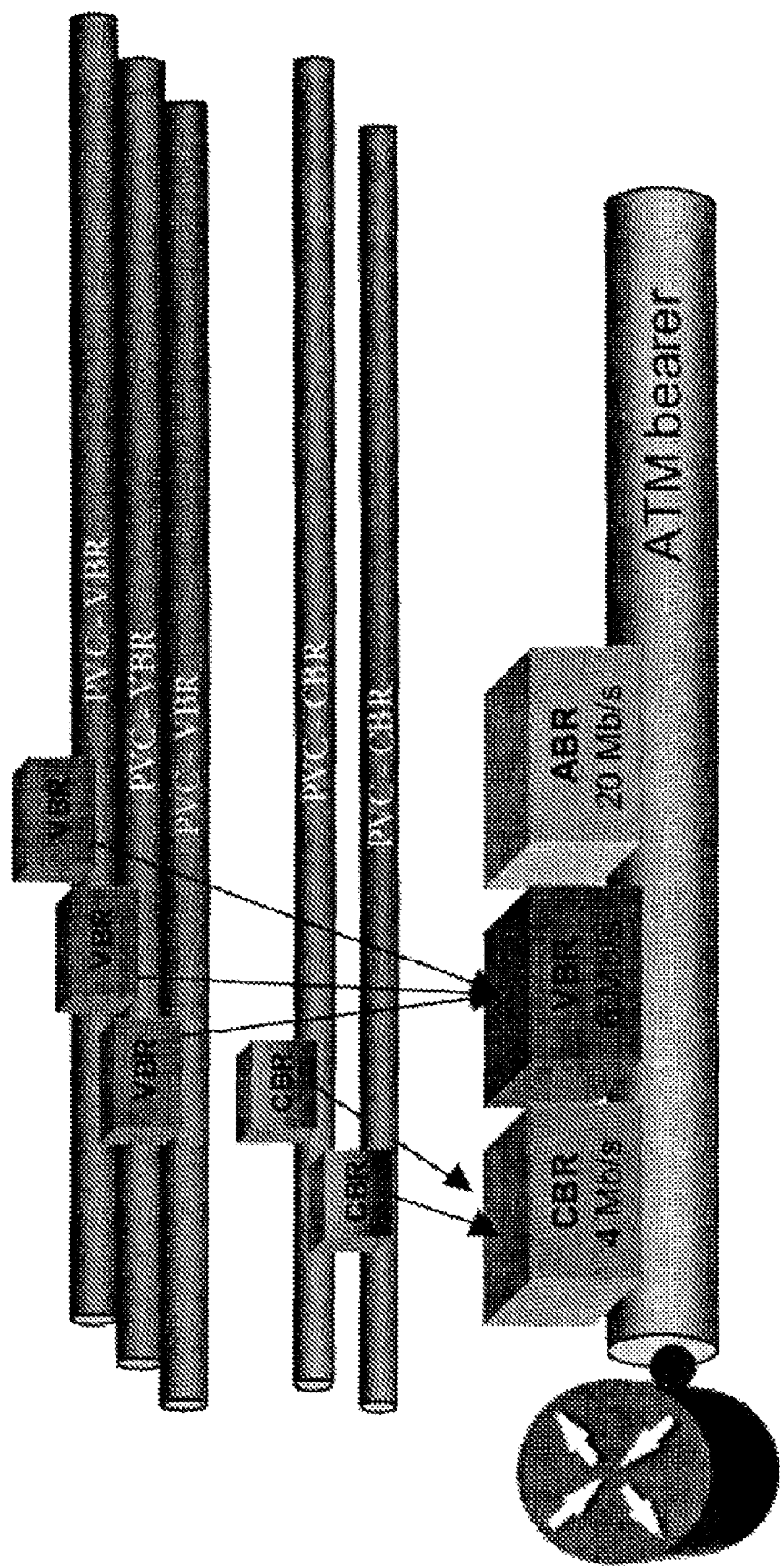

The capacity model provides a simplified model for implicit mapping, where bearer Partitions are assigned with a single CoS value and the traffic mapping is performed according to the Partition CoS only. This scenario is illustrated in FIG. 19.

Traffic mapping of partitions directly relates to the circuit resolution of a data circuit. If not all leaf partitions are mapped either to a timeslot, to an underlying link, or to an underlying partition, then the circuit resolution status is set as unresolved.

Adaptation

A data stream may consume more capacity from its physical bearer, or underlying logical bearer, than it makes available to its consumers. This is because the data stream may have signal overheads, which consume additional bandwidth from the bearer. This signaling overhead may, for example, arise due to the encapsulation of packets of one packet stream formatted in accordance with one communication protocol within packets or other data units of a different communication protocol, or they may arise because of management requirements within layers of the same technology. This is also referred to as adaptation between different technologies or technology layers. Adaptation changes the amount of consumer bandwidth attributed to a bearer partition.

When a VoIP flow is transported by an ATM PVC, for example, adaptation is required due to the different cell sizes. In fact, the bandwidth consumption on the PVC is larger than the VoIP flow bandwidth. This is also called the ATM "cell tax" for VoIP.

The capacity model allows this signaling overhead to be specified for a partition by way of an adaptation factor. For example, a partition may specify an adaptation factor of 0.8, indicating that a partition makes available only 80% of the bandwidth it consumes from an underlying bearer, with the remaining 20% being lost to the signalling overhead. Using this adaptation factor (optionally in combination with an overbooking factor if applicable), bandwidth consumption/allocation can be accurately calculated from the model.

Un-routed Data Circuits

Many of the examples given above are based on routed flows, but many data services are not explicitly routed, especially if they are low priority or do not have strict QoS demands. For example, IP alone cannot support an explicit connection; to create an explicit negotiated IP connection, additional protocols such as MPLS using RSVP are required to negotiate the connection through the network. Other technologies (for example ATM) support either permanent, explicitly routed connections (PVC), or dynamically or partially dynamically routed connections (SVC and Soft PVC), which use knowledge such as the network topology and load to intelligently switch the route of packets dynamically through the network.

Bandwidth management in dynamic flows can be challenging because there is often no direct way to relate the consumer bandwidth back to the underlying bearer layer without real-time monitoring of the network itself. The capacity model may address this by providing a method for relating topologies of data bearers to un-routed portions of consumer circuits.

A single circuit can be resolved onto multiple sequential or non-sequential topologies. The circuit's resolution over topologies is achieved by the end devices of the underlying circuits which are adjacent to a topology be included in the topology. In addition, if there are two adjacent topologies, the two topologies are typically required to have common devices or an interconnect topology between them, which is also represented in the overall route.

Figure 20:
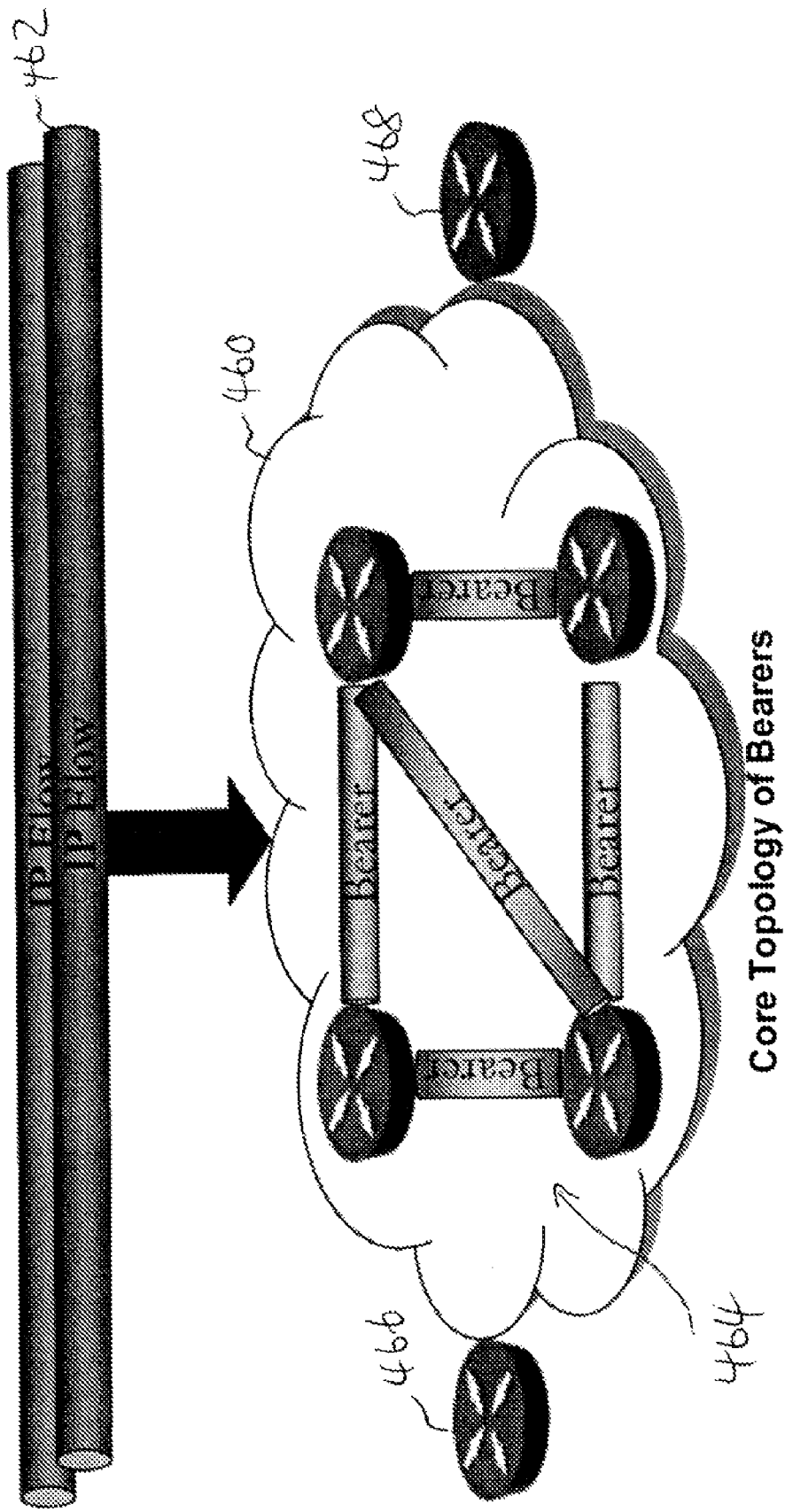

This is illustrated in FIG. 20, where an IP flow 462 is dynamically routed over an IP core 460L The core 460 is represented by a topology of data bearers 464 which may or may not be modeled within the inventory 16, and the IP flow 462 is routed over the topology itself between ingress and egress points 466, 468 at the edge of the topology. This association of the flow with the bearer topology allows the capacity model to report capacity demands of the IP bearer core topology as a whole as a matrix of ingress and egress points. The matrix is represented by each such pair that has a data flow routed between them and is therefore associated with a partition or partition hierarchy.

Even for un-routed data flows and the data bearers which support them, it is useful if the capacity model is able to model the CoS, partitioning and partitioning attributes of both the consumer layer and bearer layer for activation purposes. These attributes will typically apply to the ingress and egress devices and the port configurations used to connect into the topology. In this way all these concepts are hence applicable to un-routed data circuit hierarchies. Modeling of the traffic mapping between the un-routed flow and the underlying bearers may then be based on a statistical analysis.

Partition Policies

The capacity model extends the basic network resource model stored in inventory 16, providing the tools to represent how capacity in data networks is partitioned and how the network manages to deliver differentiated and assured quality of services.

When creating a new physical bearer the user can configure the number of partitions, the partition hierarchy, the bandwidth allocated for each partition, the traffic mapping configuration and a large number of other configuration details.

More specifically, as already described: the "Partition" entity in the capacity model represents a portion of bandwidth of a circuit (either a bearer circuit or a consumer circuit), established between two points in the network. It also records the type and characteristics of the traffic carried in that portion of bandwidth.

Partition entities are instantiated in the inventory 16 when a data circuit is created and are associated with the circuit and with the transmitting port. Each Partition instance requires a large number of attributes and relationships to be set. The following is a brief summary of such data:

The bandwidth of the partition
  The CoS of the traffic (for a consumer)
  The partition attribute values
  The traffic mapping information (for bearers), list of supported consumer types of traffic classes of service, etc.

The booking factor

The adaptation factors for all consumer circuit types

The relationships with parent or child Partitions

The process of defining partitions can therefore be complex and error-prone. To alleviate this problem, the capacity model preferably provides further tools to simplify the partitioning of circuits. In particular, this is achieved via the provision of a form of partition template, referred to herein as a "Partition Police" A Partition Policy may be stored in the inventory in the form of a Partition Policy entity.

A Partition Policy is a "named" Partition with pre-configured attributes and relationships. A Partition Policy serves as a template for actual partitions and hence exists in the inventory 16 independently of any circuit objects.

Partition Policies can allow Partitions to be instantiated quickly (in some cases automatically) with all the relevant configuration information.

Users can create Partition Policies to represent commonly used network configurations, for use at circuit creation time.

Figure 21:
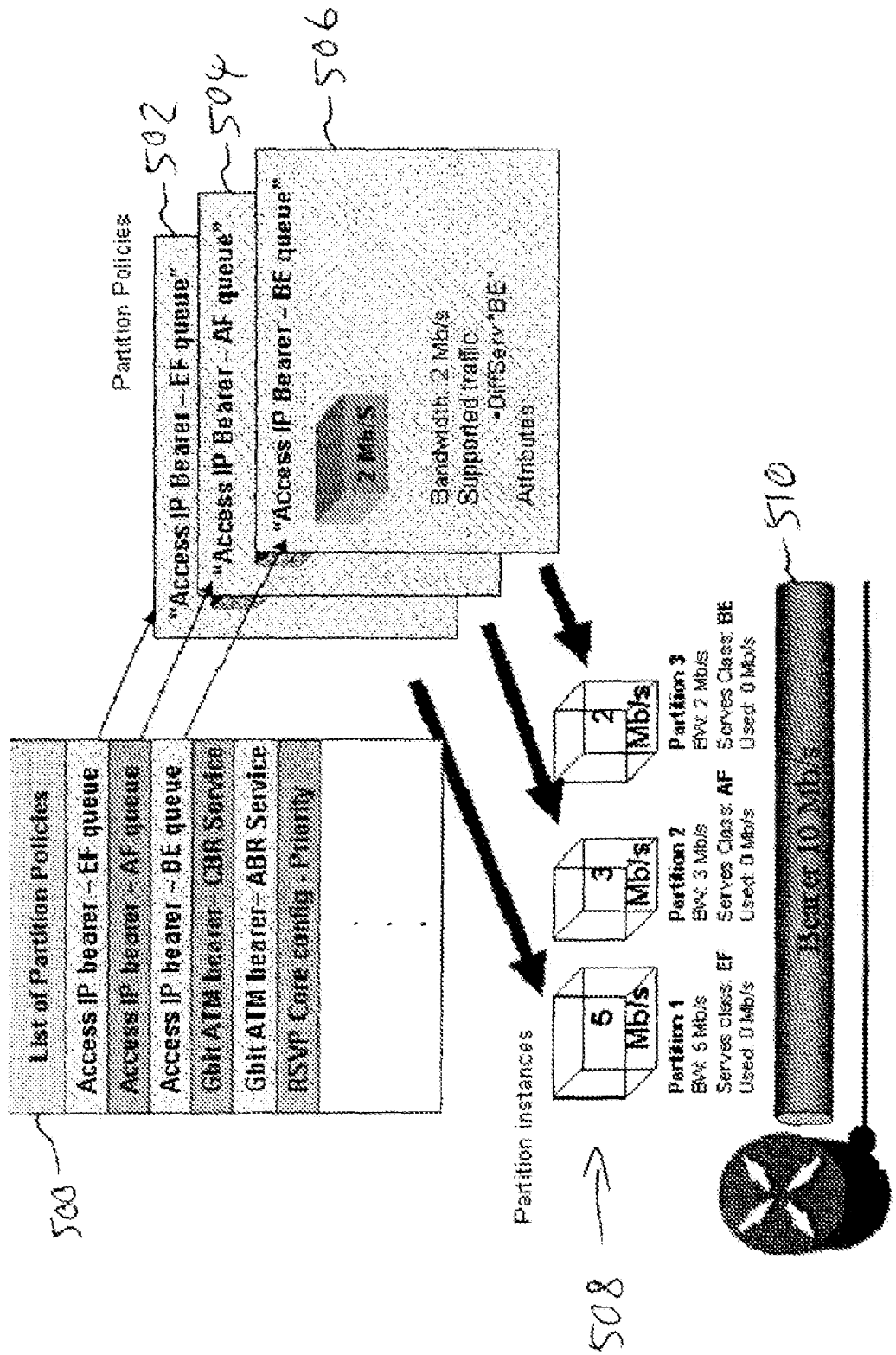
FIGS. 21 to 23 illustrate the use of partition policies in creating and modifying the capacity model.

Suppose, for example, that the user is creating a bearer circuit such as circuit 510 shown in FIG. 21. The inventory 16 provides a library 500 of Partition Policies conveniently named and pre-configured with values for all the main attributes. Configuring the partitioning of the new circuit can then be achieved by choosing the appropriate Partition Policies 502, 504, 506 from the library 500. The capacity model then uses the Partition Policies as templates to instantiate the Partitions 508 for the circuit being created.

When a Partition Policy is defined, some of the values required to configure the Partition instance, as specified in metadata, can preferably be omitted. In that case, the user is asked to enter such values when the Partition instance is created, during the circuit creation. For example, a Partition Policy can be defined with values for all parameters but with no bandwidth specified. When creating the circuit and its partitions, and selecting the appropriate Partition Policy for instantiation of a given Partition, the user is then prompted to specify the bandwidth.

Group Partition Policy

As already described above, the capacity model allows Partitions to be divided into sub-Partitions. Partition Policies can preferably capture this hierarchical organisation of Partitions.

Specifically, a Partition Policy can be a parent of other Partition Policies, in order to represent pre-configured hierarchical structures. In this case, the Policy assumes the role of group Policy (corresponding to group Partitions as discussed above). If the user selects a group Partition Policy during the configuration of a circuit, all the child Partition Policies are automatically included and corresponding (sub-) Partition instances are created to reflect the hierarchical structure between the Policies.

Figure 22:
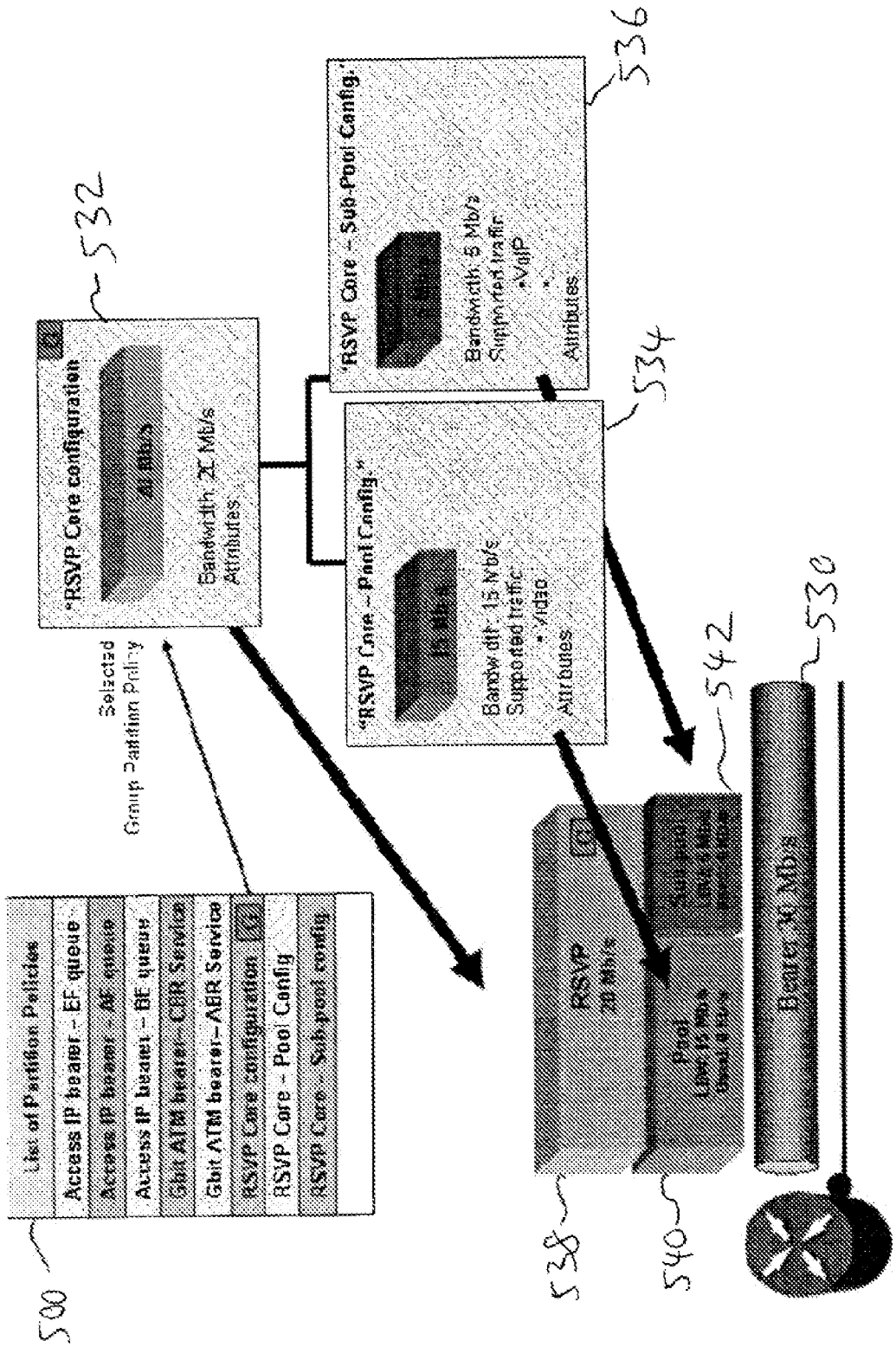

This scenario is illustrated in FIG. 22, where the user configures a bearer 530 for RSVP simply by selecting the "RSVP Core configuration" Group Partition Policy 532 from policy library 500. The capacity model then instantiates the selected group Policy 532 together with the related child policies 534 and 536, resulting in a hierarchical partition structure comprising corresponding partitions 538, 540 and 542.

Figure 23:
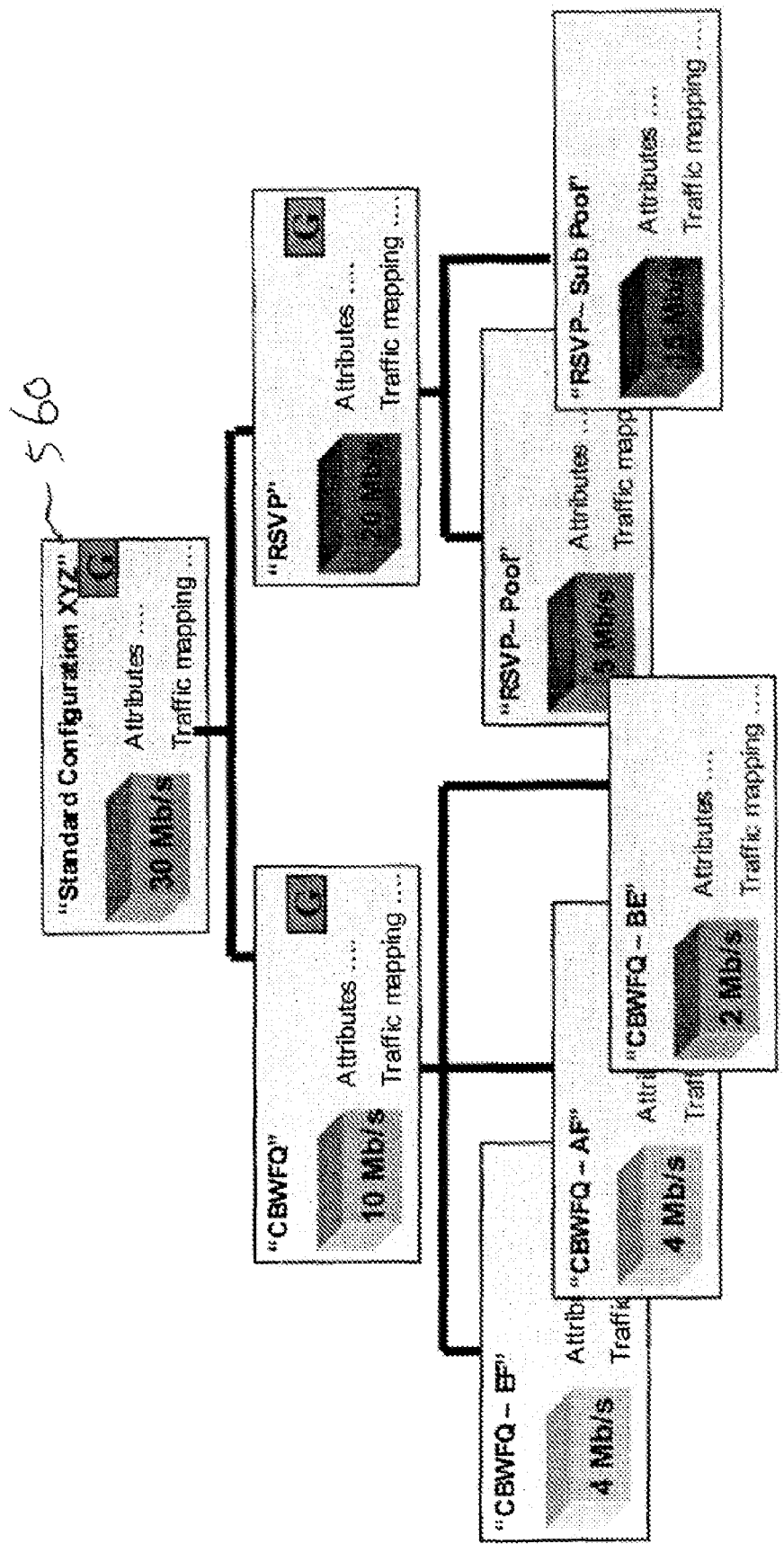

The capacity model preferably supports full hierarchy between group Policies, meaning that a group Policy can be a parent of other group Policies. This extends the role of group Policies in the capacity model allowing them to represent entire partitioning configurations. FIG. 23, for example, shows a group Partition Policy 560 named "Standard Configuration XYZ" that represents a complete partitioning configuration that could be used to provision the circuit in FIG. 16.

When creating the circuit, the user would only need to select the "Standard Configuration XYZ" group policy 560 above to obtain the instantiation of the full hierarchy of Partitions.

Global and Local Attributes

In preferred embodiments, the attributes associated with a Partition Policy can be set to be either local or global. This influences the relationship between the attribute value of the Partition instance and the attribute value of the Partition policy that originated it.

When an attribute in a Policy is set to global, its value cannot be changed for individual Partition instances that were generated from the Policy, no but only "globally" at the Policy level i.e. within the policy itself. Furthermore, a change applied to a global attribute of a Policy is automatically propagated to all Partition instances generated from that Policy. The Partition instance (in the form of a Partition entity in the inventory) thus remains linked to the Partition Policy entity from which it was generated. Essentially, the Policy attribute is passed to the Partition instance by reference rather than by value.

On the other hand when a Policy attribute is set to local, its value is copied from the Policy to the Partition instance when the Partition instance is created, and no relationship is maintained between the two. Therefore, the user can edit the attribute on a Partition instance without affecting other Partitions or the Policy itself. The Policy attribute can also be changed, without any effect on previously instantiated Partitions derived from that Policy.

Global and Local Bandwidth

Bandwidth values such as LBW and overbooking factors associated with the Policy can also be set to global or local with similar effect as described above. However, changes to any of these values can affect the capacity utilization of the underlying bearer and the support of overlying consumer Circuits.

For this reason, where any change is made to global bandwidth-related information, the capacity model preferably performs a bandwidth utilization calculation for all circuits that are affected by the global change. This process is also preferably used for changes to Policy attributes that are used to calculate LBW values—for example, where LBW values are determined in dependence on a Class of Service defined in a Policy attribute, using a defined rule (e.g. specifying that "Gold" CoS is to be implemented with 10 Mbps LBW)—or where such a calculation rule is itself changed.

Global and Local Traffic Mapping

The traffic mapping specification of a Partition Policy can preferably also be configured as global or local. Similarly to changes in global bandwidth-related attributes, a change to traffic mapping can have a considerable effect on existing Partition instances. Preferably, the capacity model does not allow a traffic mapping to be removed from a Partition if there are consumer Partitions that have been mapped according to the specification that is being removed.

Before a global traffic mapping can be deleted, the capacity model preferably verifies that the change does not invalidate the resolution of any consumer Circuit in the inventory 16.

Global and Local Partition Policies

A Partition Policy itself can preferably have its own global or local setting which affects the way a Partition instance is related to the Partition Policy used to generate it.

When a Partition Policy is set to local, all its attributes and traffic mapping information are also considered local. In this case, the Partition instance does not retain any relationship with the Policy that has generated it. The Policy is used as a template for the creation of an independent Partition instance. On the other hand, a Partition instance created from a global Partition Policy remains linked to, and reflects changes made to, the Partition Policy. However, the option is preferably provided of decoupling the Partition Instance after creation so as to remove that dependency.

The global or local setting of a Partition Policy has particular implication for group Policies. A group Partition instance generated from a global Policy retains the hierarchical relationships with the child Partitions. Preferably, no child Partitions can be directly added to or deleted from the corresponding group Partition instance. On the other hand, the addition or removal of a child Partition Policy to or from the corresponding group Policy is reflected on the instance.

Conversely, a group Partition instance generated by a local Policy does not retain any relationship with the Policy, and child Partitions can therefore be added or removed freely.

The capacity model preferably supports only coherent hierarchies, where all Partition Policies or instances in a hierarchy are set to either global or local.

Partition Policy Applicability

Part of the information set of a Partition Policy is its applicability scope. When creating a new Partition Policy the user can define on which types of circuit, device or port the Policy can be used. This information is used to limit the list of available Policies only to appropriate choices during the creation of a new circuit.

The Partition Policy Applicability setting of a group Policy preferably overrides that of its children. Thus, if a group Policy is selected, all child policies are included in the selection regardless of their individual applicability scope.

Data Model

Figure 24:
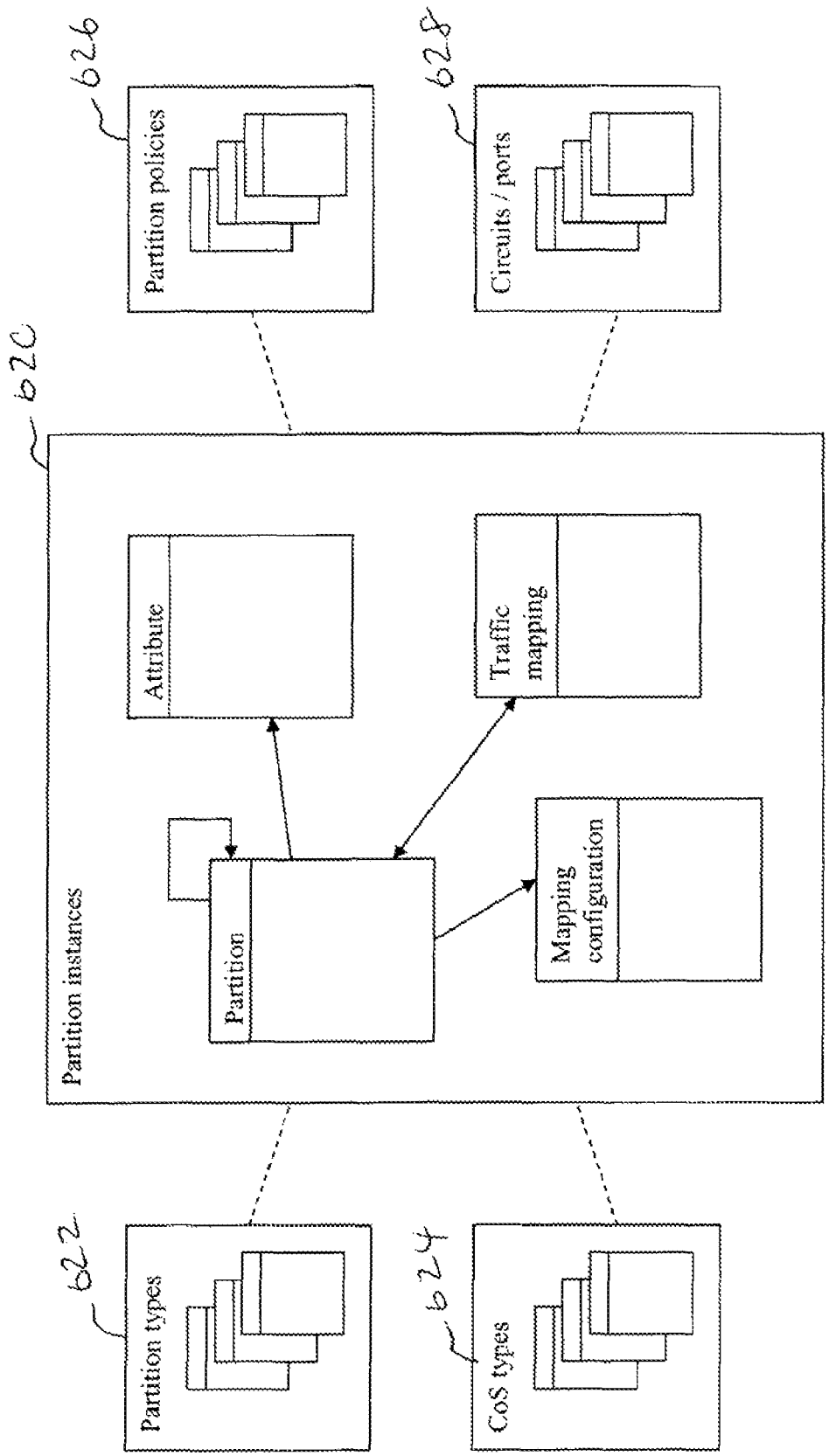
FIG. 24 illustrates in overview a data model for representing the capacity model.

As previously mentioned, the capacity model is preferably stored in a database, such as a relational database or an object database. An example of a suitable data model for implementation of the capacity model is shown in overview in FIG. 24.

The partitions themselves and the interrelationships defined between them form the core of the capacity model. This information is represented by a first set of database entities 620 ("Partition instances"), which includes "Partition" entities, "Attribute" entities, "Mapping configuration" entities and "Traffic mapping" entities.

"Partition" entities represent the partitions themselves and include the main attributes common to all types of partitions used in the model. Specifically, the "Partition" entity may include the following data:

The name of the partition

The mass-of-service assigned to the partition as a consumer

The partition's bandwidth

The booking factor for the partition

To allow hierarchical sub-partitioning as previously described, a partition may optionally also specify a parent partition to Though the current utilisation of a partition's bandwidth may in principle be calculated dynamically from the model, for efficiency, this information is preferably also stored directly in the "Partition" entity and is updated whenever bandwidth is allocated from the partition, or when a previous allocation is deleted.

In addition to the standard attributes stored in the Partition entity itself, separate "Attribute" entities are provided to store further information associated with partitions, for example attributes which are relevant only to certain kinds of partitions. An Attribute entity specifies the partition entity to which it relates and may include the following additional data:

The attribute name

The attribute data type

The attribute value

This flexible structure can allow different sets of attributes to be stored for different types of partitions, and can allow attributes to be added, changed or deleted without necessitating a change to the data model itself.

"Mapping configuration" entities define what types of consumer partition may be mapped to a given partition acting as a bearer partition, with types being specified by way of class-of-service classifications. More specifically, a "Mapping configuration" entity specifies the Partition entity for which it is defined and may include the following data:

A class-of-service attribute specifying the type of traffic that may be carried on the partition The adaptation factor applicable to traffic matching that class-of service.

A given Partition entity may have multiple "Mapping configuration" entities associated with it, each specifying a different CoS value, thus allowing a partition to carry a variety of different traffic types. Furthermore, by specifying the adaptation factor in the "Mapping configuration" entity, i.e. separately for each class-of-service carried by the partition, rather than as a single attribute of the partition itself, it is possible to take account of the fact that signaling overheads may be different for different traffic types.

It should also be noted (as has already been mentioned) that the class-of-service of consumer traffic which can be carried on a given partition acting as a bearer (as recorded in the "Mapping configuration" entity) may be different from the class-of-service of the partition itself in its role as a consumer of bandwidth from an underlying bearer (as recorded in the "Partition" entity), and different CoS classification schemes may apply in each case (e.g. a partition may specify an ATM VBR-nrt class-of-service in its role as consumer from an underlying ATM circuit, whilst carrying traffic of "Data Silver" or "Data Gold" class-of-service for overlying consumer circuits). Class-of-service parameters are discussed in more detail below.

The "Mapping configuration" entities thus define the allowable traffic mappings for a given partition. The actual traffic mappings from consumer to bearer partitions are stored in "Traffic mappings" entities. A given "Traffic mapping" entity specifies:

the relevant consumer and bearer partitions to which the mapping applies the bandwidth quantity consumed.

Other information, such as load balancing ratios, may also be stored.

Preferably, a "Traffic mapping" entity may, as an alternative, be associated directly with a bearer circuit instead of a bearer partition, where appropriate to the bearer technology in question. For example, a "Traffic mapping" entity may define a mapping from a consumer partition to a timeslot of a TDM bearer.

Further entities 628 define the circuits and ports to which the partition information relates. These may be part of a more detailed network resource model (or inventory) as described above (e.g. network resource model 24 of FIG. 1). Each partition is typically associated with a circuit and port in the model.

The database may include further entities 626 defining partition policies (templates representing standard partitioning schemes as described above). Additionally, entities 622 and 624 may be provided to allow partition types and class-of-service classification schemes to be defined as will now be described in more detail.

Partition types available to the model may be defined using a set of entities 622. For example, a partition type may specify which traffic mappings are possible for the type, a class-of-service type for the partition type (see below), and the units to be used in expressing bandwidth for partitions of the type (e.g. Mbps, Kbps Cells/s). Additionally a partition type may specify the set of attributes needed to (fully) define a partition of that type (those attributes being stored in the "Attribute" entities of partition instances). In this way, the general purpose "Partition", entity can be configured to represent more deployment-specific partition types such as "ATM Partition" or "MPLS Traffic no Trunk bandwidth Partition".

The Partition type entities 622 thus effectively provide a metadata model defining the configuration options available for configuring the partition types which can be used in the capacity model. A preconfigured metadata set may be provided with the system to define standard partition types, which may be refined or replaced by an individual network operator in accordance with their requirements.

A further example of where this configurability can provide additional flexibility is the definition of class-of-service parameters. As already described above, the capacity model allows the partitioning of bandwidth based on such class-of-service parameters, which may in turn be used to match product specifications in a product catalogue to the appropriate partitions when provisioning services.

However the exact requirements placed on a CoS classification scheme will vary depending on the deployment context. Service classification may, for example, depend upon transmission technology, protocol, layer, circuit hierarchy and a number of other deployment-specific criteria. The capacity model uses the CoS concept to generally identify the type of differentiated treatment and/or QoS that a specific traffic flow in a partition is entitled to or that a given portion of bandwidth represented by the partition is dedicated to.

For example, a partition of an ATM bearer can be classified with a CoS value that represents one of the ATM Service Categories. At the same time a pure consumer circuit representing an end-to-end connectivity service, such as a VPN, may be modeled with a partition classified by a CoS value that represents the QoS provided by the partition, such as "Gold", "Silver" or "Bronze".

To achieve the desired flexibility, the capacity model preferably allows the definition of any number of CoS types using a set of entities 624, each CoS type representing a particular classification paradigm, typically corresponding to the technology and/or the circuit layer being modeled. Each CoS Type is configured with the list of corresponding recognised classes (i.e. the CoS values for the CoS type). The following table shows an example configuration, listing CoS types with associated sets of CoS values:

| CoS Type | CoS |
| --- | --- |
| ATM | CBR |
| | VBR-rt |
| | VBR-nrt |
| | ABR |
| | UBR |
| DiffServ | Expedite Forwarding (EF) |
| | Assured Forwarding (AF11, AF21, ... ) |
| | Best Effort (BE) |

-continued

| CoS Type | CoS |
| --- | --- |
| IP Flow (TOS) | Priority (1) |
| | Immediate (2) |
| | Flash (3) |
| | Internetwork Control (6) |
| | Network Control (7) |
| IP VPN Service | Voice |
| | Data Gold |
| | Data Silver |
| | Data Bronze |

Each CoS can also include information on how to calculate the logical bandwidth (LBW) of a partition classified with that CoS value. For example, the LBW of an ATM Partition can be calculated by a different algorithm depending on the CoS (here used to model the Service Category) as defined in the following table (in which PCR=Peak Cell Rate, SCR=Sustained Cell Rate, SCRMF=Sustained Cell Rate Margin Factor):

| CoS Type | CoS | LBW calculation algorithm |
| --- | --- | --- |
| ATM | CBR | LBW = PCR |
| | VBR-rt | LBW = SCR + (PCR − SCR) * SCRMF |
| | VBR-nrt | LBW = SCR + (PCR − SCR) * SCRMF |

The various entities of the data model described above can be implemented using data structures appropriate to the database technology being used. Entities may, for example, take the form of records in a file, rows in tables of a relational database, objects in an object database, or a combination of related records, rows or objects.

Complex Service Example

Figure 25:
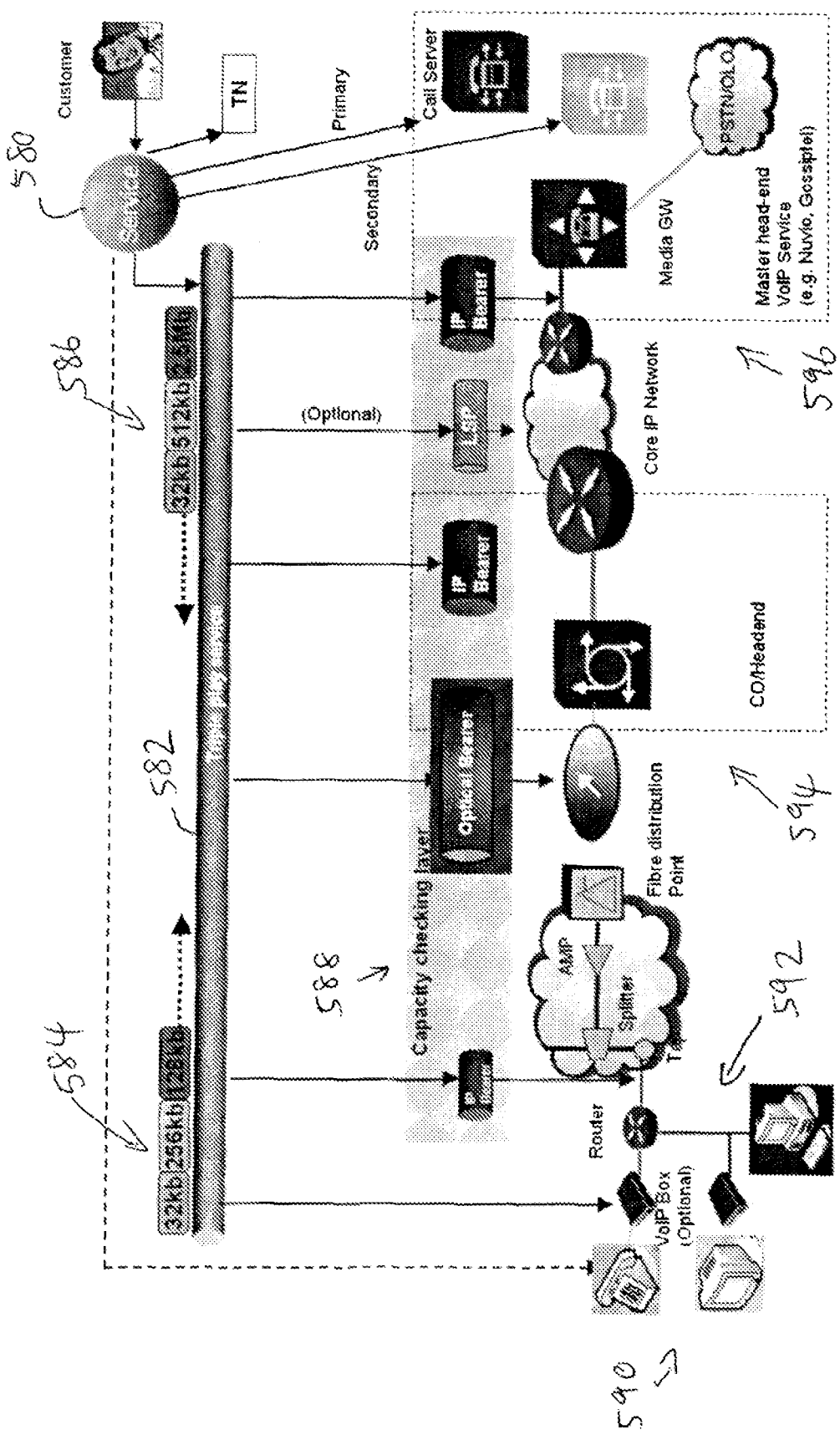
FIGS. 25 and 26 illustrate an example of a complex telecommunications service.
Figure 26:
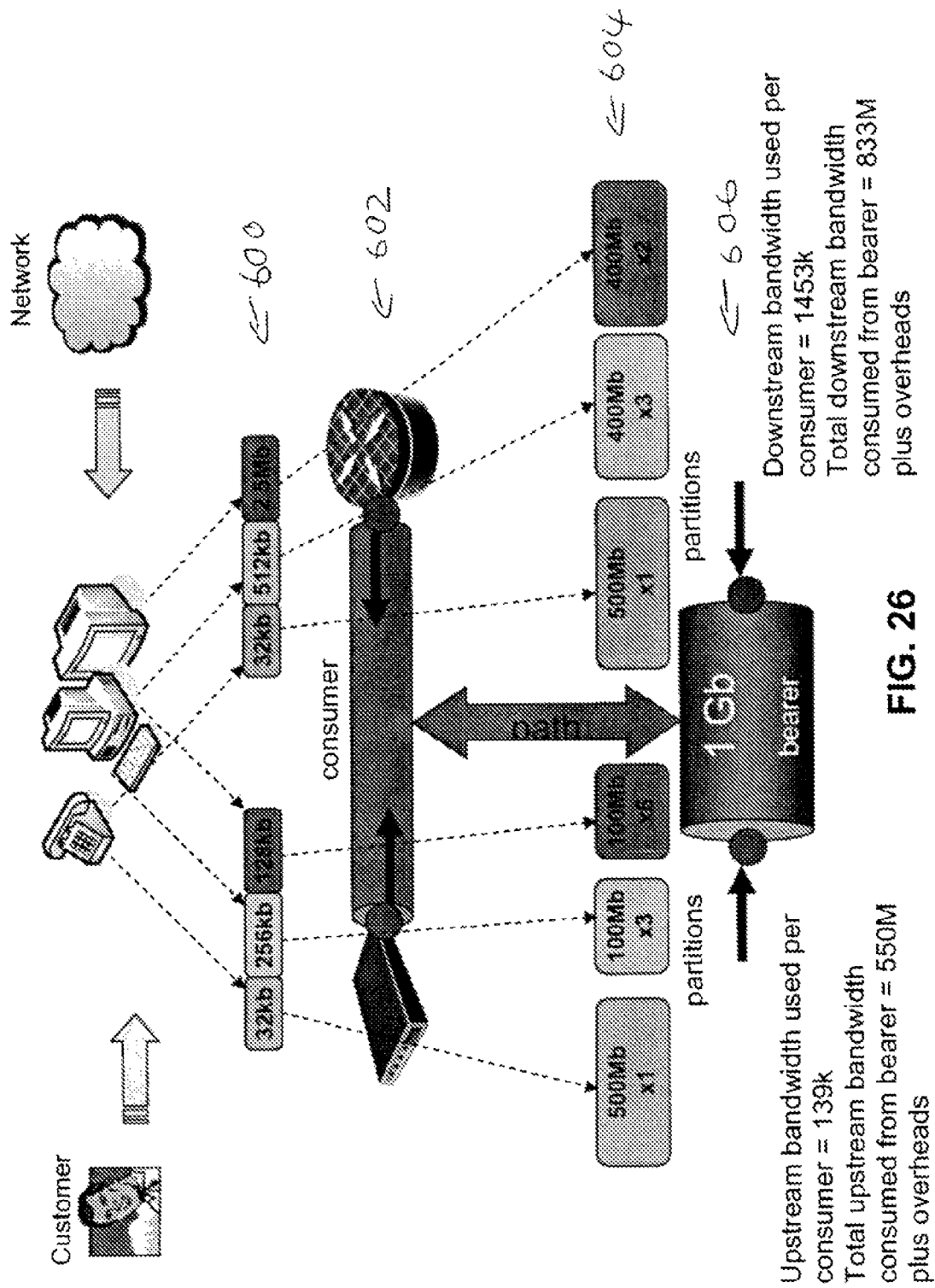

FIGS. 25 and 26 illustrate how the data capacity requirements of a complex service may be modeled using the data capacity model.

The example is a so-called "triple-play" service providing telephone, internet access and digital television over IP (IPTV) services. Each part of the service has different bandwidth requirements, and the service may be provided using a combination of networking technologies.

The implementation of the service in the network is illustrated in FIG. 25. There, the service 580 is shown in three layers: the consumer circuit 582 defined to carry the "triple-play" service as a combination of directed traffic flows 584, 586 of different bandwidths, a bearer circuit layer 588 illustrating the various (low-level) bearer circuits supporting the service, and a network layer 590 illustrating the various network resources involved in providing the service.

In the example shown, a variety of physical network components are involved in providing the service—from end-user equipment 592 (e.g. telephone, TV, set-top box, PC, VoIP box) via access and core network equipment 594 (e.g. fibre distribution point, headend, and core IP network) to server-side equipment 596 (e.g. media gateway, call server). Though these resources may all be modeled in a detailed resource model, the capacity model can allow management of data capacity from a simplified perspective in which the consumer circuit 582 is defined with capacity partitions mapped onto the underlying bearer circuits 588. These bearer circuits may then be mapped onto the underlying network resources in a detailed resource model if and to the extent required. Many capacity planning and management tasks can, however, be performed without that additional detail.

FIG. 26 shows a simplified capacity model for the service in which partitions 600 of a consumer circuit 602 are associated with partitions 604 of a bearer circuit 606 (here a 1 Gb optical bearer). Partitions are defined for each service component (i.e. each CoS), namely, telephone, data and IPTV components.

Digital TV is mainly broadcast and therefore consumes more downstream bandwidth (e.g., 2.5 Mb downstream for the TV channels with 128 kb upstream provided for control signals). Data services (such as Internet access services) are typically also asymmetrical, with greater bandwidth provided downstream than upstream. VoIP, on the other hand, is typically a symmetrical service. Accordingly, for each CoS, partitions are defined separately for each circuit direction (the partitions typically being associated with ports on end nodes/routers of the circuit).

In the example, the bearer partitions 604 specify overbooking factors defining the overbooking ratio permitted on each partition. Using these overbooking factors, the bandwidth allocated to the service from the bearer can be calculated as follows:

Upstream bandwidth=32 k+(256 k/3)+(128 k/6)= approx. 139 k

Downstream bandwidth=32 k+(512/3)+(2500/2)= approx. 1453 k

Thus, the consumer partition's bandwidth is divided by the overbooking factor of the associated bearer partition to determine the effective bandwidth allocated to the consumer partition from the bearer partition. When multiple services are provided using the same bearer partition, the total bandwidth consumption from the bearer can then be determined as the sum of the individual allocations.

The service provider will engage in a number of activities to support this service, including product management, network planning, service fulfillment and service assurance. The following illustrates examples of how the capacity model and associated data capacity management mechanisms described above can be used to support these functions, Product Specification In preferred embodiments, products, such as the triple-play product of the above example, are specified by product management processes. Preferably, products are defined within a product model, where each of the components of the product or service are represented, together with the parameterisation of the components necessary to determine the specific quality of the service. In the present example, the product definition for the no triple-play service may have three service components a video component, a telephony component, and an Internet access component. Each component of the product that specifies a network service preferably has a corresponding capacity partition in the capacity model, which offers the necessary QoS to support the requirements of the service component. Preferably, the product specification is derived from an understanding of consumer requirements and this will then determine the type of capacity partitions that are required in the network and hence the technology that needs to be deployed, both in terms of type and volumes. The understanding of the network technology required to implement the capacity partition is also codified in the product model through "technology options". Amongst other roles, this constrains the product specification process to ensure that only QoS that can be implemented in the network are specified in the product.

In the present example the components consist of i) a voice circuit characterised by 32 kbit/s bidirectional bandwidth, and a 1:1 overbooking ratio; ii) an internet circuit characterised by 256 kbit/s upstream LBW, 512 kbit/s downstream LBW, and a 1:3 overbooking ratio; and iii) a TV service including a control channel characterised by 128kbit/s upstream LBW and a 1:6 overbooking ratio and a video distribution channel characterised by 2.5 Mbit's downstream LBW and a 1:2 overbooking ratio.

In this example, a single CoS is being used to define the triple-play product, but different QoS are used for each component, the QoS being differentiated by overbooking ratio and bandwidth. Note that in more complex examples alternative CoS could also be used to further differentiate the components, enabling lower CoS, such as UBR (unspecified bit rate in ATM) to be used for those components such as Internet access, that do not require, for example, low jitter or latency.

As mentioned above, the product definition is encoded as an entity in a product model, comprising multiple sub-entities defining the service components. In this way, service components can be re-used between products (for example, different combinations or individual ones of the components could also be offered as products). Further entities in the product model represent potential implementation technologies for given service components. These implementation technologies are referred to herein as "technology options". For example, cable and DSL internet access technologies may be provided. Separating the definition of technologies from the definition of products and service components allows greater flexibility in managing the product model and in provisioning services.

When a customer orders a product, the product definition in the product model can then be used to automatically assign or create capacity in the capacity model, since the capacity and quality requirements of the product are encoded in the service components. Thus, in the present example, upstream and downstream voice, internet and video circuits would be created in the capacity model. The provisioning of services is described in more detail below.

Network Planning

The planning process is responsible for defining the technology options in the product model and then creating capacity within the network to support the anticipated customer demand for each product.

Network planning will combine the information in the product model, which specifies the capacity and quality required for each product, with information from market forecasts, which determines the likely overall market demand for the products. The result is a determination of the quantity and quality of network required to support the product portfolio.

The network planning process accordingly uses a forecast of the expected demand for a given product together with capacity requirements specified in the product model for that product to calculate a total capacity demand for a given product. This process can of course be repeated for multiple products in the product model (for example for the entire product portfolio). Capacity partitions are then created in the capacity model so as to provide additional capacity, based on the calculated capacity demand for the relevant product or products. The capacity partitions are created with QoS settings corresponding to those specified in the product model for the relevant products.

A usual method would be to deploy an access network consisting of copper cables, fibre cables or a mixture of both copper and fibre, to enable customer premises to be connected to the service providers network, to deploy network edge devices, such as DSLAM s or MSANs at the edge of the network and to connect the edge devices to both the access network and the core network. The core network may also need to be scaled to support the capacity demanded by each product. Deployment of the Access network is a major civil engineering project with long lead-times and is usually carved out in advance to anticipate customer demand. However the scale, timing and sequencing of the other activities can be critical to the success of the service provider as they represent significant investments and opportunities.

The triple-play service, in common with all other network services, will require sufficient edge capacity, in the correct catchment areas, to meet the anticipated demand from consumers in those catchment areas. The deployment of edge capacity will be determined by a number of factors, including existing take-up rate, market forecast and special discounting.

In addition, data capacity partitions of the correct total LBW and the correct QoS will typically need to be planned and implemented from the edge devices to the network and also across the network to support the capacity being passed in and out of the network from the edge devices. These pipes will terminate at either the data centres providing applications, or the switched network to provide for example, the voice component of the service. The following is an illustration.

The access network is copper and has been deployed to enable all residential premises to be connected to their local service provider serving location.

The edge devices are deployed and populated with ports to connect to the access network in sufficient quantities to meet the forecast demand for new customer connections.

Edge devices are connected to various points in the SP network as follows.

a. A partition characterised by: 500 Mbit/s bidirectional bandwidth, 1:1 o/b ratio, is deployed from the edge device to a local Metro Node to carry voice traffic. The placement of the Metro node is a strategic planning decision. In this example. Metro nodes are distributed widely to enable local switching of the voice traffic and so minimising requirements for network capacity. The bandwidth has been determined by planners to be sufficient to carry the total predicted voice traffic transmitting the edge device to and from the Access network. Note that this partition will support all voice traffic, not just traffic from the triple play service, so a substantial bandwidth is allocated.

b. A partition characterised by: 100 Mbit/s upstream LBW, 400 Mbits downstream LBW, 1:3 o/b ratio, is deployed from the edge device to a central data centre, where the Internet service is provided. Note that this partition is sized to support all internet services from the edge device, not just those that are part of the triple-play service. The choice of which data centre is connected to is a network planning decision, dependent on network strategy.

c. A partition characterised by: 100 Mbit/s upstream LEW, 1:6 o/b ratio, is deployed from the edge device to a central data centre where the IPTV service is provided. This will carry all the IPTV control traffic from the edge device. The choice of which data centre is connected to is a network planning decision, dependent on network strategy.

d. A partition characterised by; 400 Mbit/s downstream LBW, 1:2 o/b ratio, is deployed from the edge device to the central data centre chosen to support the IPTV service from the edge device in question. This will carry all the IPTV payload traffic from the edge device. The choice of which data centre is connected to is dependent on network strategy.

Service Provisioning

The provisioning of a service corresponding to an ordered product, as defined in the product model, for a consumer consists of 3 steps; i) designing how the service can be satisfied in the network using the inventory model, ii) assigning the capacity to the inventory model, so indicating that the capacity is utilised for the service and iii) activating the service in the network itself through the exchange of commands. The service will initially be preferably expressed as a Service Order, which specifies the service in terms of the product model and hence the required components of the service, together with the required QoS for each component.

In this example, amongst other necessary steps, the design process in the service provisioning system will identify the edge device that the consumer is connected to and will identify the correct partitions that need to be utilised in order to provide the service. This is achieved using the following three steps. The QoS specified by the service components contained in the Order must match with QoS offered by the partitions terminating on the identified edge device. The partitions must terminate at the correct parts of the network in order to deliver the service; either a Metro node or a data centre offering IPTV and/or Internet. Also each partition must have sufficient free LBW to be able to contain the LBW specified by the service component. If these three design criteria cannot be met, then this particular provisioning activity will fail and some remedial steps will take place, including connecting the consumer to another edge device, further planning activities and renegotiating alternative QoS options with the consumer. There may be other steps in the design process, such as selecting the optimum data centre or Metro node if there is a choice made available by the planners when they designed the network, or selecting a preferred technology if there is a choice. In the latter case, the technology options in the product model will record which technology has the highest priority for the service provider.

The assign step will then allocate the LBW specified by each of the service components to the partition that the design step has identified for that component. This will create consumer traffic flows, which are fixed amounts of LBW consumed in each partition by each service component. It will also associate the specific service identifier associated with the customer order, to the consumer traffic flow. The amount of LBW is then no longer available for use by other services. In this way, the service provider maintains strict control of the capacity utilisation of the network and the service quality offered to consumers. This is in contrast to earlier forms of data network management, which do not assign specific capacity consumption to each service carded by the network and so have limited control over utilisation and service quality.

The activation step will then generate a set of commands to achieve the following. i) implement the consumer traffic flows within the bearer partitions, which may require issuing commands to some or all of the devices that the partition passes through ii) connect the data streams from the consumer into the assigned partitions, which involves sending commands to the edge device to connect traffic from the access port to the consumer and into the appropriate traffic flows of the core network and iii) activate the service at the Metro node and data centres, which may require additional commands to the identified devices. These commands are generated using a mapping from the data capacity management model in the inventory model to technology, vendor and device specific commands. Definition of this mapping is typically a one-off process carried out as part of the initial configuration of the system, though some reconfiguration may subsequently be required in response to technology changes in the network. Once configured, the complexity of the mapping is then hidden from the day-to-day operations in the network.

The system preferably maintains information on provisioned services in the form of a service model. For each provisioned service, a service instance is created in the service model specifying any service-specific parameters. The service instance is linked the product definition in the product model on which the service is based. Furthermore, the service instance is linked to the circuits and capacity partitions in the capacity model which have been used to implement the service. The circuits and capacity partitions in the capacity model are themselves linked to the resource model, and in particular to the specific network resources used to provide the circuits. In this way, the service, capacity and resource models together provide a direct link between service provisioned to users, and the network resources (representing, for example, specific pieces of equipment, in particular device and port details) used to provide them. This link has not traditionally been explicitly modeled in network management systems, and can enable improved service assurance functionality, as will be described next.

Service Assurance

As mentioned above, the inventory model (in particular through the capacity model) provides a direct relationship between the services provided on the network and the device and port details that constitute the network. This mapping is useful in correlating fault and performance information obtained from the network to their impact on service. The inventory model can associate fault and performance information associated with devices or device components with individual services and aggregated traffic flows.

The system preferably therefore provides an assurance component which receives fault and performance information from the network. The fault and performance data typically relates to particular network resources, e.g. particular devices/ports. The assurance component then uses the capacity and service models to identify the services affected by any particular faults in the network, or by performance problems. This is achieved by identifying the bandwidth partition(s) and/or circuit(s) in the capacity model which are affected by the network resource to which fault or performance information relates, and then identifying the service(s) in the service model which use the identified circuit(s) or bandwidth partition(s). Action can then be taken, for example to advise the users of the identified services of the problem or offer alternative services.

Furthermore, the inventory model records the QoS that is offered to the consumer within the data partitions, so that the QoS as determined by fault and performance management can be compared to the QoS that has been agreed with the customer as part of Service Level Agreement management and the impact on Service Level Guarantees can be determined. A service level agreement may, for example, be defined for the product or for a provisioned service.

The assurance component can then measure the performance achieved in the network in providing services, compare it with the service level agreement for the individual services, and take action where services do not meet the service level agreements. For example, a service level agreement may specify penalty payments in the event of a failure by the service provider to meet agreed service levels. The service assurance component may calculate such payments based on the measured performance, and pass the information to a billing system for adjustment of the user's bill.

The capacity model, capacity management system and associated databases and systems described herein may be implemented using computer technology known to those skilled in the art. For example, with reference to FIG. 1, network, planning/engineering system 10, service provisioning system 12, resource manager 14 and activation system 18 may be provided in the form of software applications running on one or more computers (for example, one computer per subsystem). The inventory 16, in particular the network model 24 and capacity model 26 may be implemented as one or more databases stored on the computer executing the resource manager application, or stored on one or more separate computers, e.g. database servers. Individual components 10, 12, 14, 18 may be provided as one or more servers, accessed from separate client computers (not shown) via a network. A single integrated application/server may also provide the functionality of all the components and databases. Other arrangements are also possible.

It will be understood that the present invention has been described above purely by way of example, and modification of detail can be made within the scope of the invention.

The invention claimed is:

1. A method of processing capacity information relating to data capacity in a data network in which a consumer circuit is carried on, and consumes bandwidth made available by, a bearer circuit, the method comprising:

storing, in a network information database, a bearer circuit entity representing a bearer circuit, and associating bearer capacity information with the bearer circuit entity specifying a first bandwidth quantity, the first bandwidth quantity defining a quantity of bandwidth made available by the bearer circuit;

storing in the network information database a consumer circuit entity representing a consumer circuit, and associating consumer capacity information with the consumer circuit entity specifying a second bandwidth quantity, the second bandwidth quantity defining a quantity of bandwidth allocated to the consumer circuit;

associating the consumer capacity information with the bearer capacity information in the network information database to indicate that the second bandwidth quantity allocated to the consumer circuit is to be consumed from the first bandwidth quantity made available by the bearer circuit, utilizing a computer; and storing a partition entity for a given bandwidth partition, the given bandwidth partition representing an allocation of bandwidth to a circuit, wherein the partition entity is associated with first information defining a first quantity of bandwidth allocated to the given partition from an underlying bearer, and second information defining a second quantity of bandwidth made available by the given partition for allocation to other partitions;

wherein the second information defining the second quantity of bandwidth made available by the given partition comprises a booking factor for indicating that the second quantity is a fraction of, equal to, or a multiple of the first quantity.

2. A method according to claim 1, wherein associating the consumer capacity information of the consumer circuit with the bearer capacity information of the bearer circuit comprises associating a consumer partition entity defining a bandwidth partition of the consumer circuit with a bearer partition entity representing a bandwidth partition of the bearer circuit to indicate that the bandwidth allocated to the consumer circuit which is represented by the consumer partition entity is to be consumed from the bandwidth made available by the bearer circuit which is represented by the bearer partition entity.

3. A method according to claim 1, wherein associating capacity information with a circuit entity representing a circuit comprises defining a partitioning of a quantity of at least one of bandwidth made available by the circuit and bandwidth allocated to the circuit into one or more partitions, each partition representing a portion of the bandwidth quantity.

4. A method according to claim 3, wherein defining a partitioning comprises storing one or more bandwidth partition entities in the network information database each representing one of the defined partitions and being associated with the circuit entity.

5. A method according to claim 1, wherein a partition entity representing a bandwidth partition of the bearer circuit is associated with an information transmission channel of the bearer circuit.

6. A method according to claim 1, comprising associating capacity information with a circuit entity representing a circuit, the capacity information separately specifying data capacity in respect of each circuit direction.

7. A method according to claim 1, wherein a circuit represents a connection in the network between two network nodes or between two ports on respective network nodes, each node or port being represented in the network information database by a node or port entity, the method comprising associating a bandwidth partition entity with one of the node or port entities of the circuit to thereby represent a bandwidth partition of the circuit for traffic originating from that node or port.

8. A method according to claim 7, wherein a partition entity representing a bandwidth partition of the bearer circuit is associated with a traffic transmission mechanism associated with the node or port, the traffic transmission mechanism being assigned to transmit data traffic associated with the partition.

9. A method according to claim 8, wherein the traffic transmission mechanism comprises a queue of a port scheduler, the port scheduler being assigned to forward data traffic associated with the partition using the queue.

10. A method according to claim 1, comprising providing an alert if a total bandwidth allocated to circuits or other partitions from the bandwidth of the given partition exceeds a predetermined threshold.

11. A method according to claim 1, comprising preventing the allocation of bandwidth to a circuit or partition from the given partition if after allocation a total bandwidth allocated to circuits or partitions from the bandwidth of the given partition would exceed a predetermined threshold.

12. A method according to claim 1, comprising allocating bandwidth to the consumer circuit from the bearer circuit by associating a bandwidth partition entity associated with the consumer circuit with a bandwidth partition entity associated with the bearer circuit in the network information database.

13. A method according to claim 1, comprising associating, with the partition entity representing the given bandwidth partition, information defining one or more traffic or service types for which the bandwidth represented by the partition entity is to be used.

14. A method according to claim 13, comprising, in response to a request to allocate bandwidth to a consumer circuit having associated service quality information specifying a service quality which the consumer circuit is to provide:

creating a consumer partition entity representing the bandwidth to be allocated;

selecting a bearer partition entity from amongst a plurality of bearer partition entities associated with one or more bearer circuits;

the selecting step comprising:
    selecting, if available, a partition entity having a service quality matching the consumer circuit service quality; and, if no partition with a matching service quality is available, selecting an alternative partition entity; and associating the created partition entity with the selected partition entity to indicate allocation of the bandwidth from the partition represented by the selected partition entity.

15. A method according to claim 1, comprising, for a given bearer partition entity representing bandwidth available for allocation to circuits and being associated with one or more consumer partition entities representing bandwidth allocated from the available bandwidth, calculating the utilisation of the available bandwidth by reference to the associated consumer partition entities.

16. A method according to claim 1, comprising, for the given partition representing an allocation of bandwidth, defining one or more sub-partitions representing portions of the bandwidth allocated to the given partition.

17. A network information database for storing capacity information relating to data capacity in a data network in which a consumer circuit is carried on, and consumes bandwidth made available by, a bearer circuit, the network information database stored on a computer readable medium for use by a computer and comprising:

a bearer circuit entity representing a bearer circuit;

bearer capacity information associated with the bearer circuit entity specifying a first bandwidth quantity, the first bandwidth quantity defining a quantity of bandwidth made available by the bearer circuit;

a consumer circuit entity representing a consumer circuit;

consumer capacity information associated with the consumer circuit entity specifying a second bandwidth quantity, the second bandwidth quantity defining a quantity of bandwidth allocated to the consumer circuit;

and wherein the consumer capacity information is associated with the bearer capacity information in the network information database to indicate that the second bandwidth quantity allocated to the consumer circuit is to be consumed from the first bandwidth quantity made available by the bearer circuits;

a partition entity for a given bandwidth partition, the given bandwidth partition representing an allocation of bandwidth to a circuit, wherein the partition entity is associated with first information defining a first quantity of bandwidth allocated to the given partition from an underlying bearer, and second information defining a second quantity of bandwidth made available by the given partition for allocation to other partitions;

wherein the second information defining the second quantity of bandwidth made available by the given partition comprises a booking factor for indicating that the second quantity is a fraction of, equal to, or a multiple of the first quantity.

* * * * *

UNITED STATES PATENT AND TRADEMARK OFFICE
CERTIFICATE OF CORRECTION

| | | |
|---|---|---|
| PATENT NO. | : 7,898,947 B2 | Page 1 of 1 |
| APPLICATION NO. | : 11/753521 | |
| DATED | : March 1, 2011 | |
| INVENTOR(S) | : Briscoe et al. | |

It is certified that error appears in the above-identified patent and that said Letters Patent is hereby corrected as shown below:

On the Title Page
    Abstract, Item (57), line 1; please replace "disclosed," with -- disclosed. --.

In the claims:
    Claim 17, col. 44, line 47; please replace "circuits;" with -- circuit; --.

Signed and Sealed this

Thirteenth Day of November, 2012

David J. Kappos
*Director of the United States Patent and Trademark Office*